US010191157B2

(12) United States Patent
Dai et al.

(10) Patent No.: US 10,191,157 B2
(45) Date of Patent: Jan. 29, 2019

(54) PRECISE LOW-LATENCY GNSS SATELLITE CLOCK ESTIMATION

(71) Applicant: Deere & Company, Moline, IL (US)

(72) Inventors: Liwen L. Dai, Torrance, CA (US); Sonia U. Kuntz, Redondo Beach, CA (US); Yujie Zhang, Torrance, CA (US); Yiqun Chen, Torrance, CA (US)

(73) Assignee: DEERE & COMPANY, Moline, IL (US)

( * ) Notice: Subject to any disclaimer, the term of this patent is extended or adjusted under 35 U.S.C. 154(b) by 323 days.

(21) Appl. No.: 15/257,092

(22) Filed: Sep. 6, 2016

(65) Prior Publication Data

US 2017/0269222 A1 Sep. 21, 2017

Related U.S. Application Data

(60) Provisional application No. 62/310,080, filed on Mar. 18, 2016.

(51) Int. Cl.
*G01S 19/07* (2010.01)
*G01S 19/41* (2010.01)
*G01S 19/44* (2010.01)

(52) U.S. Cl.
CPC .............. *G01S 19/07* (2013.01); *G01S 19/41* (2013.01); *G01S 19/44* (2013.01)

(58) Field of Classification Search
CPC .................................. G01S 19/07; G01S 19/41
See application file for complete search history.

(56) References Cited

U.S. PATENT DOCUMENTS 5,757,646 A 5/1998 Talbot et al.
5,828,336 A * 10/1998 Yunck ..................... G01S 19/07
342/357.31
(Continued)

FOREIGN PATENT DOCUMENTS

EP 2759849 A1 7/2014
WO 2012151006 A1 11/2012

OTHER PUBLICATIONS

PPPserve. "Network based Gnss Phase Biases to enhance Ppp Applications —a new Service Level of Gnss Reference Station Providers." PPPserve Final Report. Feb. 2014. Pages 1-86. (Year: 2014).*
(Continued)

*Primary Examiner* — Gregory C. Issing

(57) ABSTRACT

A wide-lane ambiguity and a respective satellite wide-lane bias are determined for the collected phase measurements for each satellite for assistance in narrow-lane ambiguity resolution. Satellite correction data is determined for each satellite in an orbit solution based on the collected raw phase and code measurements and determined orbital narrow-lane ambiguity and respective orbital satellite narrow-lane bias. A slow satellite clock correction is determined based on the satellite orbital correction data, the collected raw phase and code measurements, and clock narrow-lane ambiguity and respective satellite narrow-lane bias. A low latency clock module or data processor determines lower-latency satellite clock correction data or delta clock adjustment to the slow satellite clock based on freshly or recently updated measurements of the collected raw phase measurements that are more current than a plurality of previous measurements of the collected raw phase measurements used for the slow satellite clock correction to provide lower-latency clock correction data.

22 Claims, 12 Drawing Sheets

(56) References Cited

U.S. PATENT DOCUMENTS

| | | | |
|---|---|---|---|
| 7,119,741 | B2 | 10/2006 | Sharpe et al. |
| 7,961,143 | B2 | 6/2011 | Dai et al. |
| 8,368,590 | B2 | 2/2013 | Vollath et al. |
| 8,368,591 | B2 | 2/2013 | Talbot et al. |
| 8,542,146 | B2 | 9/2013 | Vollath |
| 8,773,303 | B2 | 7/2014 | Doucet et al. |
| 9,057,780 | B2 | 6/2015 | Bar-Sever et al. |
| 9,128,176 | B2 | 9/2015 | Seeger |
| 9,146,319 | B2 | 9/2015 | Leandro |
| 2008/0074319 | A1 | 3/2008 | Han et al. |
| 2011/0187590 | A1 | 8/2011 | Leandro |
| 2012/0154215 | A1 | 6/2012 | Vollath et al. |
| 2012/0162007 | A1* | 6/2012 | Leandro ................ G01S 19/04 342/357.42 |
| 2012/0182181 | A1* | 7/2012 | Dai ....................... G01S 19/41 342/357.31 |
| 2016/0377730 | A1* | 12/2016 | Drescher ............... G01S 19/13 342/357.23 |

OTHER PUBLICATIONS

Chassagne, Olivier. "The Future of Satellite Navigation, One-Centimeter Accuracy with PPP", GNSS Forum, pp. 51-54, Mar.-Apr., 2012 [online] [retrieved on Aug. 31, 2016]. Retrieved from the Internet: <URL:http://www.insidegnss.com/auto/marapr12-Chassagne.pdf>.

Choy, Suelynn."GNSS Precise Point Positioning: A Fad or the Future of Satellite Navigation and Positioning?" Lecture slides [online].School of Mathematical and Geospatial Sciences Royal Melbourne Institute of Technology University, Australia, 2014 [retrieved on Aug. 31, 2016]. Retrieved from the Internet: <URL:http://www.fig.net/resources/proceedings/fig_proceedings/fig2014/ppt/TS05A/Choy.pdf>.

Murfin, Tony. "Hexagon's Acquisition of Veripos: Why Did This Go Down?" GPS World [online], Apr. 16, 2014 [retrieved on Aug. 31, 2016]. Retrieved from the Internet: <URL:http://gpsworld.com/hexagons-acquisition-of-veripos-why-did-this-go-down/>.

Murfin, Tony. "Look, No Base-Station!—Precise Point Positioning (PPP)." GPS World [online], Mar. 20, 2013 [retrieved Aug. 31, 2016]. Retrieved from the Internet: <URL:http://gpsworld.com/look-no-base-station-precise-point-positioning-ppp/>.

Laurichesse, Denis. "Innovation: Carrier-Phase Ambiguity Resolution, Handling the Biases for Improved Triple-Frequency PPP Convergence." GPS World, Apr. 3, 2015 [online], [retrieved Aug. 31, 2016]. Retrieved from the Internet: <URL:http://gpsworld.com/innovation-carrier-phase-ambiguity-resolution/>.

Dixon, Kevin. "StarFire: A Global SBAS for Sub-Decimeter Precise Point Positioning." NavCom Technology Inc., ION GNSS 19th International Technical Meeting of the Satellite Division [online], Sep. 26-29, 2006 [retrieved on Aug. 31, 2016]. Retrieved from the Internet: <URL:http://www.gdgps.net/system-desc/papers/starfire.pdf>.

Shi, Junbo and Gao, Yang. "A Comparison of Three PPP Integer Ambiguity Resolution Methods." GPS Solutions 18.4 [online], 2013, pp. 519-528 [retrieved on Aug. 31, 2016]. Retrieved from the Internet: <URL:http://link.springer.com/article/10.1007/510291-013-0348-2>.

Leandro, R., et al. "RTX Positioning: The Next Generation of cm-accurate Real-Time GNSS Positioning." Trimble Terrasat GmbH [online brochure], Sep. 2012 [retrieved on Aug. 31, 2016]. Retrieved from the Internet: <URL:https://www.trimble.com/positioning-services/pdf/WhitePaper_RTX.pdf>.

Goode, Matthew. "New Developments in Precise Offshore Positioning." Ocean Business / Offshore Survey [online presentation], Apr. 15-16, 2015, Southampton, United Kingdom [retrieved on Aug. 31, 2016]. Retrieved from the Internet: <URL:http://www.oceanbusiness.com/wp-content/uploads/2015/04/1410_MatthewGoode.pdf>.

Ott, Lee. "Use of Four GNSS Systems in Operational Precise Point Positioning Service." Furgo Satellite Positioning [online presentation], 2015 [retrieved on Aug. 31, 2016]. Retrieved from the Internet: <URL:http://www.gps.gov/cgsic/meetings/2015/ott.pdf>.

Toor, Pieter. "Munich Satellite Navigation Summit 2014."Veripos, Ltd. [online presentation], Mar. 26, 2014 [retrieved on Aug. 31, 2016]. Retrieved from the Internet: <URL:URL:http://www.terrastar.net/files/docs/Munich_Summit_2014_-_PPP_Session_-_Pieter_Toor_-_VERIPOS.pdf>.

Jokinen, Altti Samuli. "Enhanced Ambiguity Resolution and Integrity Monitoring Methods for Precise Point Positioning." Centre for Transport Studies, Department of Civil and Environmental Engineering, Imperial College London [online thesis], Aug. 2014 [retrieved on Aug. 31, 2016]. Retrieved from the Internet: <URL:https://spiral.imperial.ac.uk/bitstream/10044/1/24806/1/Jokinen-A-2014-PhD-Thesis.pdf>.

"Real-time Service." International GNSS Service [online article], 2015 [retrieved on Aug. 31, 2016]. Retrieved from the Internet: <URL:http://www.igs.org/rts>.

"Introducing the IGS Real-Time Service (RTS)." International GNSS Service [online], 2015 [retrieved on Aug. 31, 2016]. Retrieved from the Internet <URL:ftp://igs.org/pub/resource/pubs/IGS_Real_Time_Service-131031.pdf>.

Duman, Angie, et al. "PPP: IGS Announces the Launch of RTS-IGS." xyHt [online], Apr. 20, 2015 [retrieved on Aug. 31, 2016]. Retrieved from the Internet: <URL:http://www.xyht.com/professional-surveyor-archives/ppp-igs-announces-the-launch-of-rts-igs/>.

Laurichesse, D.; Mercier, F.; and Berthias, J. P. "Real-time PPP with Undifferenced Integer Ambiguity Resolution, Experimental Results." Proceedings of the ION GNSS [online] Sep. 21-24, 2010 [retrieved on Aug. 31, 2016]. Retrieved from the Internet <URL:http://www.ppp-wizard.net/Articles/laurichesse_ion_gnss_2010_bdp.pdf>.

Blewitt, Geoffrey. "Carrier Phase Ambiguity Resolution for the Global Positioning System Applied to Geodetic Baselines up to 2000 km" Journal of Geophysical Research [online], vol. 94, No. B8, pp. 10187-10203, Aug. 10, 1989 [retrieved on Aug. 31, 2016]. Retrieved from the Internet: <URL:http://www.colorado.edu/ASEN/asen6090/blewitt.pdf#page=1&zoom=auto,-154,811>.

Banville, Simon. "Ambiguity Resolution." BlackDot GNSS [online], Apr. 25, 2015 [retrieved on Sep. 6, 2016]. Retrieved from the Internet <URL:http://www.blackdotgnss.com/2015/04/25/ambiguity-resolution/>.

Teunissen, P.J.G. "Towards a Unified Theory of GNSS Ambiguity Resolution." Journal of Global Positioning Systems [online], vol. 2, No. 1, pp. 1-12, 2003 [retrieved on Sep. 6, 2016]. Retrieved from the Internet <URL:http://citeseerx.ist.psu.edu/viewdoc/download?doi=10.1.1.454.4430&rep=rep1&type=pdf>.

Teunissen, P.J.G. "Least-Squares Estimation of the Integer GPS Ambiguities." International Association of Geodesy General Meeting, Section IV: Theory and methodology, Beijing, China, 1993 [online] retrieved on Sep. 6, 2016]. Retrieved from the Internet: <URL:http://citeseerx.ist.psu.edu/viewdoc/download?doi=10.1.1.475.9393&rep=rep1&type=pdf>.

"Hemisphere GNSS Debuts Atlas GNSS Correction Service." GPS World Staff. GPS World [online], Jun. 15, 2015 [retrieved on Sep. 6, 2016]. Retrieved from the Internet: <URL:http://gpsworld.com/hemisphere-gnss-debuts-atlas-gnss-correction-service/>.

Teunissen, P.J.G. "GNSS Ambiguity Bootstrapping: Theory and Application." Proceedings of International Symposium on Kinematic Systems in Geodesy, Geomatics and Navigation [online], pp. 246-254, Jun. 2001 [retrieved on Nov. 16, 2016]. Retrieved from the Internet <URL:http://www.ucalgary.ca/engo_webdocs/SpecialPublications/KIS%2001/PDF/0503.PDF>.

Teunissen, P.J.G. "Theory of Integer Equivariant Estimation with Application to GNSS." Journal of Geodesy [online], vol. 77, No. 7-8, pp. 402-410, 2003 [retrieved on Nov. 16, 2016]. Retrieved from the Internet <URL:http://link.springer.com/article/10.1007/s00190-003-0344-3>.

Wen, Zhibo, et al. "Best Integer Equivariant Estimation for Precise Point Positioning." Institute for Communications and Navigation 2012 Proceedings [online], pp. 279-282, Sep. 12-14, 2012 [retrieved on Sep. 6, 2016]. Retrieved from the Internet <URL:http://ieeexplore.ieee.org/xpls/abs_all.jsp?arnumber=6338525&tag=1>.

(56) References Cited

OTHER PUBLICATIONS

Shi, J., Gao, Y. "A Fast Integer Ambiguity Resolution Method for PPP." Proceedings of the ION GNSS [online], Nashville, TN, pp. 3728-3734, Sep. 17-21, 2012 [retrieved on Nov. 16, 2016]. Retrieved from the Internet <URL:https://www.ion.org/publications/abstract.cfm?articleID=10548>.
Teunissen, P.J.G. "The Least-squares Ambiguity Decorrelation Adjustment: A Method for Fast GPS Integer Ambiguity Estimation." Journal of Geodesy [online], vol. 70, No. 1-2 pp. 65-82, 1995 [retrieved on Nov. 16, 2016]. Retrieved from the Internet <URL:http://link.springer.com/article/10.1007/BF00863419>.
De Jonge, P. and Tiberius, C. "The LAMBDA Method for Integer Ambiguity Estimation: Implementation Aspects." Publications of the Delft Computing Centre [online], LGR-Series No. 12, pp. 1-47, Aug. 1996 [retrieved on Sep. 6, 2016]. Retrieved from the Internet <URL:http://www.citg.tudelft.nl/fileadmin/Faculteit/CiTG/Over_de_faculteit/Afdelingen/Afdeling_Geoscience_and_Remote_Sensing/pubs/lgr12.pdf>.
Chang, X. W., Yang, X. and Zhou, T. "MLAMBDA: A Modified Lambda Method for Integer Least-squares Estimation." Journal of Geodesy [online], vol. 79, No. 9, pp. 552-565, Dec. 2005 [retrieved on Sep. 6, 2016]. Retrieved from the Internet <URL:http://www.cs.mcgill.ca/~chang/pub/MLAMBDA.pdf>.
Baroni, Leandro and Kuga, Helio K. "Evaluation of Two Integer Ambiguity Resolution Methods for Real Time GPS Positioning." WSEAS Transactions on Systems 8.3, pp. 323-333, Mar. 2009 [retrieved on Sep. 6, 2016]. Retrieved from the Internet <URL:https://www.researchgate.net/profile/Helio_Kuga/publication/41146341_Evaluation_of_Two_Integer_Ambiguity_Resolution_Methods_for_Real_Time_GPS_Positioning/links/543687fe0cf2bf1f1f2bd8d1.pdf>.
Verhagen, Sandra. "The GNSS Integer Ambiguities: Estimation and Validation." Delft Institute of Earth Observation and Space Systems, Delft University of Technology, Jan. 31, 2005 [retrieved on Sep. 6, 2016]. Retrieved from the Internet <URL:http://repository.tudelft.nl/islandora/object/uuid:07c6f2be-3a70-42aa-97b3-894a5770454d/?collection=research>.
Lin, P. and Zhang, X. "Precise Point Positioning With Partial Ambiguity Fixing." Sensors [online journal], vol. 15, No. 6, pp. 13627-13643, Jun. 10, 2015 [retrieved on Sep. 6, 2016]. Retrieved from the Internet:<URL:http://www.mdpi.com/1424-8220/15/6/13627/htm>.
Verhagen, Sandra, et al. "GNSS Ambiguity Resolution: Which Subset to Fix?" IGNSS Symposium 2011, International Global Navigation Satellite Systems Society, University of New South Wales, Sydney, Australia, Nov. 15-17, 2011 [retrieved on Sep. 6, 2016]. Retrieved from the Internet:<URL:http://repository.tudelft.nl/islandora/object/uuid:075deb5b-5253-4daf-97be-f7126519612b/?collection=research>.

Pan, L., Cai, C., Santerre, R. and Zhu, J. "Combined GPS/GLONASS Precise Point Positioning with Fixed GPS Ambiguities." Sensors [online journal], vol. 14, No. 9, pp. 17530-17547, Sep. 18, 2014 [retrieved on Sep. 6, 2016]. Retrieved from the Internet: <URL:http://www.mdpi.com/1424-8220/14/9/17530/htm>. <DOI:10.3390/s140917530>.
Gratton, L., Joerger, M. and Pervan, B. "Carrier Phase Relative RAIM Algorithms and Protection Level Derivation." Journal of Navigation [online], vol. 63, No. 2, pp. 215-231, Apr. 1, 2010 [retrieved on Sep. 6, 2016]. Retrieved from the Internet: <URL:https://www.cambridge.org/core/journals/journal-of-navigation/article/div-classtitlecarrier-phase-relative-raim-algorithms-and-protection-level-derivationdiv/AEA4489E97E3C131EBD3E2184B3F0DD7> <DOI:10.1017/S0373463309990403>.
"Trimble XFill RTK." Trimble Navigation Limited [online white paper], Sep. 2012 [retrieved on Sep. 6, 2016]. Retrieved from the Internet: < URL: http://trl.trimble.com/docushare/dsweb/Get/Document-630776/022543-551_Trimble%20xFill%20White%20Paper_1012_sec.pdf>.
NovAtelCORRECT. NovAtel Inc. [online brochure], Nov. 2015 [retrieved on Sep. 6, 2016]. Retrieved from the Internet: <URL: http://www.novatel.com/assets/Documents/Papers/NovAtelCORRECT-Brochure.pdf>.
Reußnerr, N. and Wanniger, L. "GLONASS Inter-frequency Code Biases and PPP Carrier-Phase Ambiguity Resolution." Geodetic Institute, Technische Universität Dresden, IGS Workshop, Jul. 2012 [retrieved Aug. 31, 2016]. Retrieved from the Internet: <URL:https://tu-dresden.de/bu/umwelt/geo/gi/gg/ressourcen/dateien/veroeffentlichungen/igs2012.pdf?lang=en>.
Sleewagen, J., et al. "Digital versus Analog: Demystifying GLONASS Inter-Frequency Carrier Phase Biases." Inside GNSS [online], May/Jun. 2012 [retrieved Aug. 31, 2016]. Retrieved from the Internet<URL:http://www.insidegnss.com/auto/mayjune12-Sleewaegen.pdf>.
Carcanague, S., et al. "Finding the Right Algorithm Low-Cost, Single-Frequency GPS/GLONASS RTK for Road Users." Inside GNSS [online], vol .8 No. 6, pp. 70-80, Nov./Dec. 2013 [retrieved Aug. 31, 2016]. Retrieved from the Internet:<URL:http://www.insidegnss.com/auto/novdec13-WP.pdf>.
Wang, J. and Feng, Y. "Reliability of Partial Ambiguity Fixing with Multiple GNSS Constellations." Journal of Geodesy [online], vol. 87, No. 1, pp. 1-14, Jun. 12, 2012 [retrieved Aug. 31, 2016]. Retrieved from the Internet<URL: http://link.springer.com/article/10.1007/s00190-012-0573-4> <DOI:10.1007/s00190-012-0573-4>.
The International Search Report and the Written Opinion of the International Searching Authority issued in counterpart application No. PCT/US17/021530, dated May 24, 2017 (8 pages).

* cited by examiner

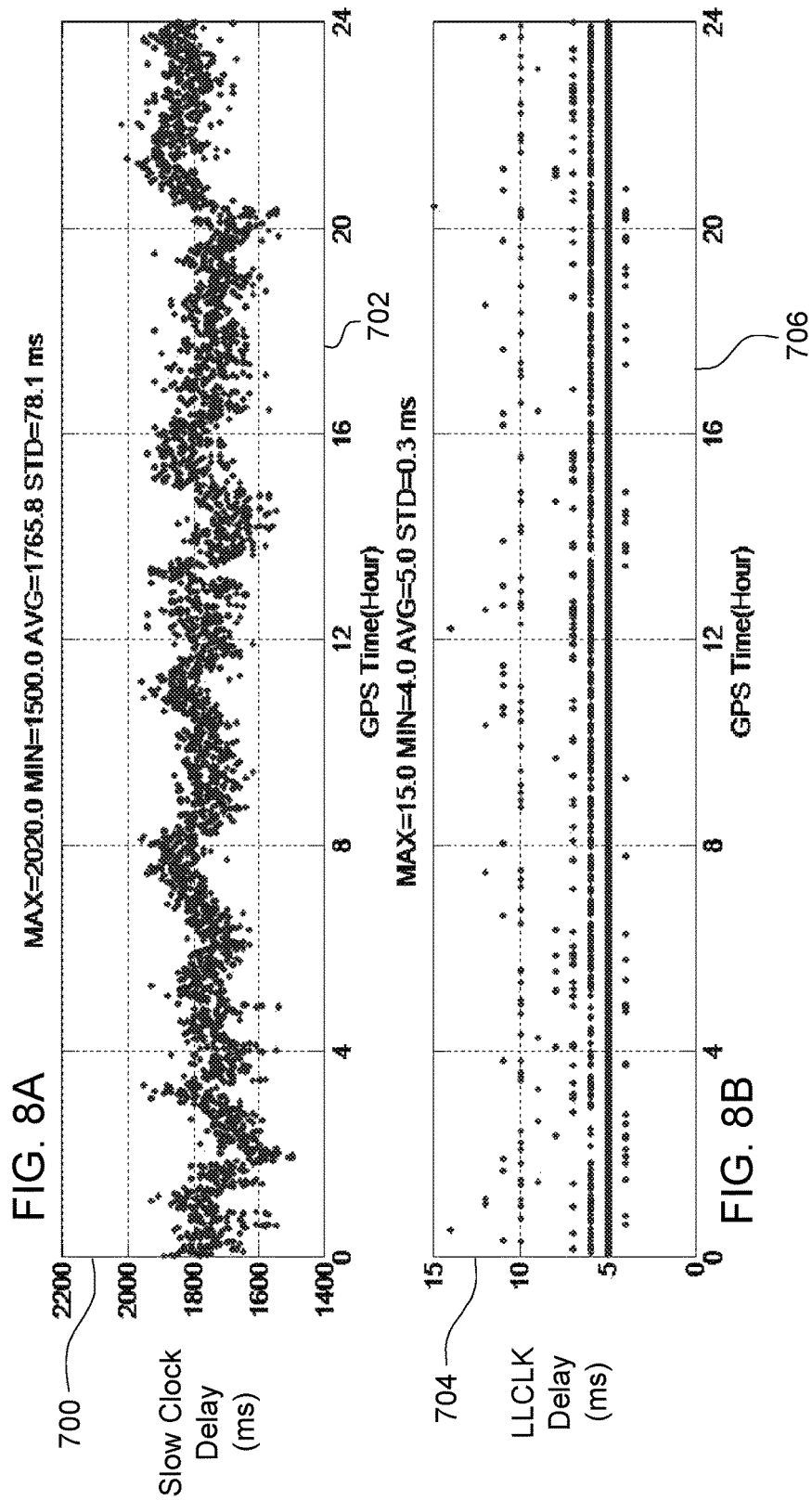

PRECISE LOW-LATENCY GNSS SATELLITE CLOCK ESTIMATION

RELATED APPLICATION

This document (including the drawings) claims priority and the benefit of the filing date based on U.S. provisional application No. 62/310,080, filed Mar. 18, 2016 under 35 U.S.C. § 119 (e), where the provisional application is hereby incorporated by reference herein.

FIELD

This disclosure relates to method and system for providing a satellite correction signal with a precise, low-latency Global Navigation Satellite System (GNSS) satellite clock.

BACKGROUND

In certain prior art, service providers provide correction signals to end users for satellite navigation receivers via wireless signals, such as satellite wireless signals on the satellite L-band. In a GNSS constellation, each satellite clock may have a satellite clock bias or clock error that can be measured with reference to a GNSS system clock time, among other alternatives. The correction data contains corresponding clock bias or clock solutions for each satellite within view or reception range, at the mobile receiver of the end user. The satellite clock bias with a respective satellite identifier is transmitted to end users or subscribers of the satellite correction signal. There is a latency between the phase measurements of reference satellite receivers that are used to determine correction data and receipt of the correction data at the mobile receiver of the end user. The timeliness, update rate and latency at which the satellite clock bias is provided to the satellite navigation receivers of end users can impact the precision of position estimates of the satellite navigation receivers. For example, the estimated reference orbital position of the satellite can be impacted by error in the clock bias or clock solutions, which, in turn, can contribute to error or less precision in the position solutions of the satellite receiver. Accordingly, there is need to reduce the latency in the clock bias provided in the correction signal.

SUMMARY

In one embodiment, a method or system provides a satellite correction signal with a precise, low latency satellite clock estimate. An electronic data processing center is arranged to collect raw phase measurements from a plurality of reference receivers at known corresponding locations. A measurement pre-processing (MPP) module or a data processor determines a wide-lane ambiguity and a respective satellite wide-lane bias for the collected phase measurements for each satellite. An orbit solution module or the data processor determines satellite correction data for each satellite in an orbit solution based on the collected raw phase and code measurements and determined orbital narrow-lane ambiguity and respective orbital satellite narrow-lane bias, which can be estimated with the assistance of the determined wide-lane ambiguity and wide-lane bias. A clock solution module or data processor determines a slow satellite clock correction (e.g., moderate-latency satellite clock correction) based on the satellite orbital correction data, the collected raw phase and code measurements, and clock narrow-lane ambiguity and respective satellite narrow-lane bias, which can be estimated with the assistance of the determined wide-lane ambiguity and wide-lane bias. A low latency clock module or data processor determines lower-latency satellite clock correction data or delta clock adjustment to the slow satellite clock based on freshly or recently updated measurements of the collected raw phase measurements that are more current than a plurality of previous measurements of the collected raw phase measurements used for the slow satellite clock correction to provide lower-latency clock correction data. The data processing center incorporates the satellite orbital correction data and the low latency clock correction data into the correction data with global validity for the GNSS for transmission (e.g., satellite or wireless transmission) to one or more mobile receivers.

In one configuration, the latency is defined as or based on time difference between an earlier epoch associated with a collection (and observation at reference stations) of measurements for processing and application of processed measurements at a later epoch in mobile rover receiver.

BRIEF DESCRIPTION OF THE DRAWINGS

FIG. 7, collectively

FIG. 8A provides an illustrative chart of computation time in providing slow clock solutions versus GNSS time.

FIG. 8B provides an illustrative chart of computation time in providing low latency clock solutions versus GNSS time.

DETAILED DESCRIPTION OF PREFERRED EMBODIMENT

Figure 1A:
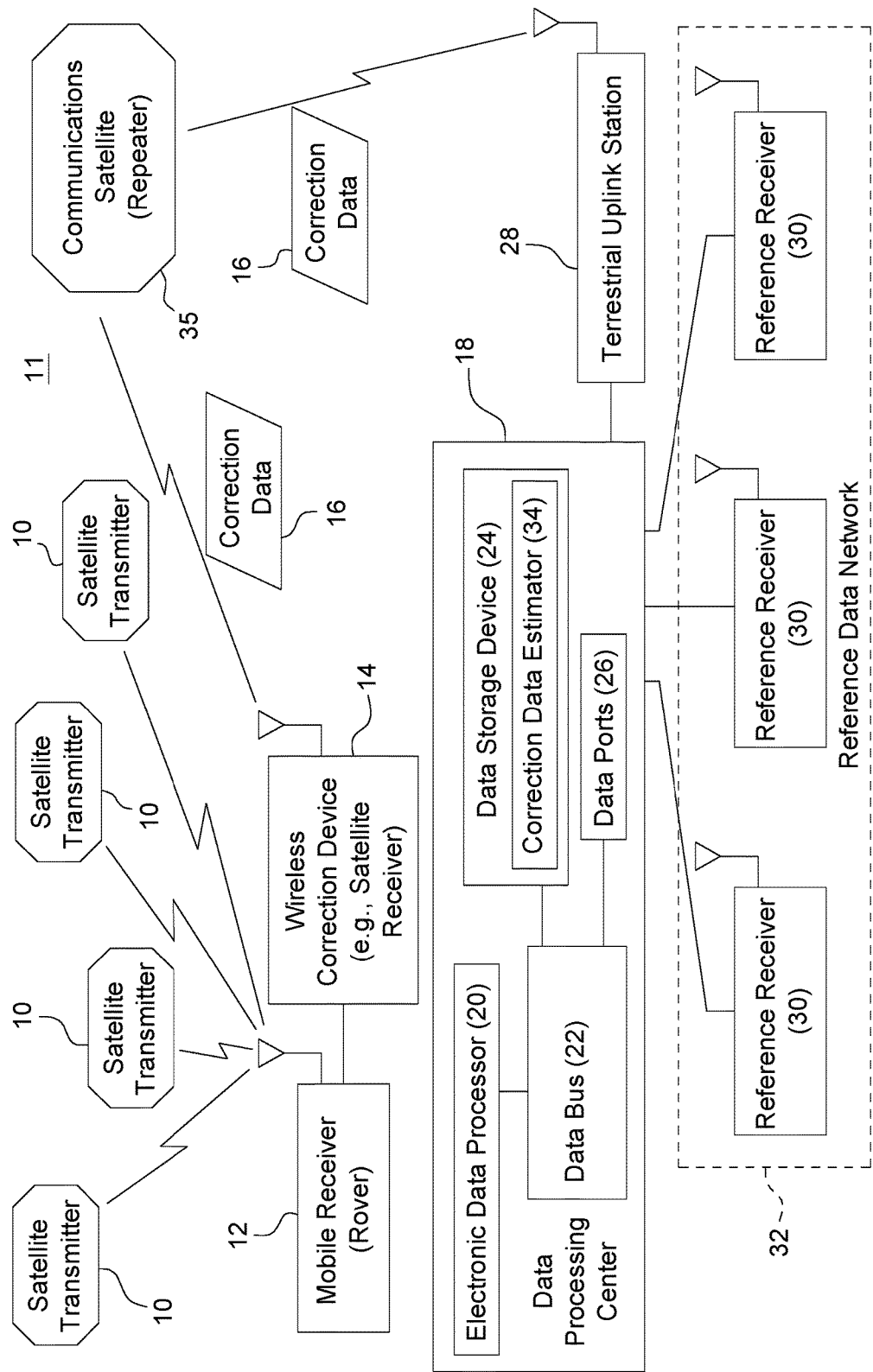
FIG. 1A is a block diagram of one embodiment of a system for providing a satellite correction signal with a precise, low-latency Global Navigation Satellite System (GNSS) satellite clock, where the satellite correction signal is provided via a communications satellite.

As used in this document, a module or estimator may refer to software, hardware, or both. If a module is realized as software, it may be stored in a data storage device 24 for processing by a data processor 20. Adapted to, configured to, or arranged to means that a module, estimator, or other device is capable of performing a function described in the specification or supporting a feature. For example, adapted to, configured to or arranged to may include a module that is programmed with software instructions that are stored in a data storage device 24 for processing by a data processor 20 to perform specific functions set forth in this document.

Approximately or about shall mean a tolerance of plus or minus twenty-five percent of any value, number or quantity unless otherwise specifically defined.

A location-determining receiver or satellite receiver (12, 30), such as a Global Navigation Satellite System (GNSS) receiver, is capable of receiving carrier phase measurements that are subject to ambiguities, such as integer ambiguities, in the number of cycles or fractional cycles of the received satellite signal. An epoch or measurement time means a specific instant in time of a navigation satellite system or the time interval during which the mobile receiver measures the carrier phase (e.g., at a certain corresponding frequency or rate). The receiver (12, 30) determines or resolves ambiguities of carrier phase measurements to estimate accurately the precise position or coordinates of the receiver. Although the code phase (code) or pseudo-range measurements of the GNSS receiver (12, 30) are not associated with integer ambiguities in the cycles of the received satellite, code phase measurements do not provide the centimeter level position accuracy required for certain applications. As used throughout this document, ambiguities are often specific to the context of particular equations which relate to observations from one or more receivers of carrier phase signals from one or more satellites. Accordingly, it is possible to have wide-lane (WL) ambiguities, narrow-lane (NL) ambiguities, zero-difference (ZD) ambiguities, single-difference (SD) ambiguities, double-difference (DD) ambiguities, real-time-kinematic (RTK) ambiguities, and refraction-corrected (RC) ambiguities that relate to phase measurements from one or more receivers, or one or more satellites. Further, certain ambiguities will be specific to certain modules because different modules or predictive filters (e.g., Kalman filters) within those modules to accommodate different update rates of the filters and states of the filters, and communication of data or states between the filters of different modules. In this document, any reference to ambiguity can refer to a singular ambiguity or plural ambiguities.

If the satellite navigation receiver can receive at least two frequencies, such as L1 and L2 frequencies, the difference of the L1 and L2 carrier phase measurements can be combined to form wide-lane (WL) measurement (e.g., with a wavelength of approximately 86.25 centimeters for GPS) and the sum of the L1 and L2 carrier phase measurements can be combined to form narrow-lane (NL) measurements (e.g., with a wavelength of approximately 10.7 centimeters). The wide-lane measurements facilitate quick and efficient resolution of wide-lane integer ambiguities, whereas the narrow-lane measurements facilitate precise and accurate resolution of narrow-lane ambiguities with minimal phase noise. The refraction-corrected ambiguities compensate for the first order of atmospheric delay.

Single difference measurements (e.g., of carrier phase or code phase (code)) are generally formed with respect to one satellite, a reference receiver 30 and a rover receiver (12). Alternately, single difference measurements can be formed with respect to one receiver (reference receiver 30 or rover 12) and a pair of satellites.

In contrast, double difference measurements are generally formed with respect to two satellites, a reference receiver 30 and a rover receiver (12), or by subtracting two single-difference measurements. However, certain double-difference measurements can be formed with two single-difference measurements from the same reference receiver at two different times and associated with a pair of satellites, as will be described later in FIG. 6.

Referring to FIG. 1A, FIG. 1B, FIG. 3 and FIG. 4, a method or system provides a satellite correction signal with a precise, low-latency satellite clock estimate. An electronic data processing center 18 is arranged to collect raw phase measurements from a plurality of reference receivers 30 at known corresponding locations (e.g., three dimensional coordinates). A measurement pre-processing (MPP) module (36 in FIG. 3) or a data processor 20 of the data processing center 18 determines a wide-lane ambiguity and a respective satellite wide-lane bias for the collected phase measurements for each satellite to provide assistance or appropriate constraints for efficient or rapid resolution of narrow-lane ambiguities. An orbit solution module 38 or the data processor 20 determines satellite correction data 16 for each satellite in an orbit solution at an orbit correction rate based on the collected raw phase and code measurements and determined orbital narrow-lane ambiguity and respective orbital satellite narrow-lane bias, which can be estimated with the assistance of the determined wide-lane ambiguity and wide-lane bias. Advantageously, in on embodiment, the wide-lane ambiguity and respective wide-lane bias, determined by the measurement preprocessing module 36, can be shared and leveraged amongst one or more predictive filters (39, 43, 412) in the other modules (38, 44, 42) of the correction data estimator 34. A clock solution module 44 or data processor 20 determines a slow satellite clock correction (e.g., moderate-latency satellite clock correction) at a slow update rate (or moderate update rate) based on the satellite orbital correction data 50, the collected raw phase and code measurements, and clock narrow-lane ambiguity and respective satellite narrow-lane bias, which can be estimated with the assistance of the determined wide-lane ambiguity and wide-lane bias. A low latency clock module 42 or data processor 20 determines lower-latency satellite clock correction data 16 or delta clock adjustment to the slow satellite clock at a fast update rate based on freshly or recently updated measurements of the collected raw phase measurements that are more current than a plurality of previous measurements of the collected raw phase measurements used for the slow satellite clock correction to provide lower-latency clock correction data 16. In one embodiment, the fast update rate is a fixed rate that is greater than the slow update rate or orbit rate (e.g., orbital update rate). However, in an alternate embodiments, the fast update rate can be varied (dynamically) based on: (1) availability, reliability or quality (e.g., signal strength, dilution of precision, or other quality metrics) of the raw carrier phase measurements from particular satellites or reference stations, or (2) selecting a subset of the satellite measurements or reference stations as active for use to estimate correction data based on availability, reliability or quality of the raw carrier phase measurements from time to time.

The data processing center 18 incorporates the satellite orbital correction data 50 and the low-latency clock correction data 16 into the correction data 16 with global validity for the GNSS for transmission (e.g., satellite or wireless transmission) to one or more mobile receivers 12 that operate in a precise positioning mode, such as a precise point positioning (PPP) mode. For example, the data processing center 18 incorporates the satellite wide-lane bias, the satellite orbital correction data, the satellite narrow-lane bias from the slow clock solution and the low latency clock correction data into the correction data, encoded on the global satellite differential correction signal, with global validity for the GNSS transmission to one or more mobile receivers. The precise positioning mode (e.g., PPP mode) uses precise clock and orbital solutions for the received signals of the satellites, along with satellite biases, to provide precise correction data 16 that is globally valid or that does not depend on a locally valid differential data, such as real-time kinematic (RTK) correction data 16 that is locally valid, accurate for short-baselines between the reference station and the mobile station (e.g., for applications or off-road vehicles that require greater than reliable decimeter level accuracy).

In one embodiment, the orbit rate (e.g., orbital update rate) is less than (e.g., or less than or equal to) the slow update rate; an orbit zero-difference filter 404 is applied to facilitate the estimation, by the orbit narrow-lane estimator 39 (e.g., narrow-lane filter), of the orbit narrow-lane ambiguity and respective narrow-lane satellite bias at the orbit update rate based on the collected raw phase measurements. In another embodiment, the fast update rate is greater than the slow update rate or the orbit rate; a clock zero-difference filter 408 can be applied to facilitate the estimation, by the clock narrow-lane estimator 43 (e.g., narrow-lane filter), of the clock narrow-lane ambiguity and respective narrow-lane satellite bias at the slow update rate based on the collected raw phase measurements.

In accordance with FIG. 1A, a system is capable of providing correction data 16, encoded in a satellite correction signal, with a precise, low-latency Global Navigation Satellite System (GNSS) satellite clock solution or precise, low-latency clock data in real-time. The final satellite clock solution comprises precise, low-latency clock data that represents an integrated solution of two simultaneous or parallel processes for estimation of GNSS satellite clock estimates: (1) a slow clock solution and (2) low-latency clock solution or intermediate low-latency solution.

The latency can be measured based on time difference between an earlier measurement time (e.g., epoch) associated with a collection of phase measurements of satellite signals at one or more reference receivers 30 and receipt of processed measurements at a later measurement time (e.g., epoch) at the mobile receiver 12 or rover. For example, FIG. 2A and FIG. 2B subdivide the above latency time difference into different time periods for additional analysis, which will be described later. Low-latency means a lower latency than a moderate latency of the slow clock solution of the clock solution module 44. The lower latency solution (e.g., of the low latency clock module 42) may be referred to as a fast clock solution (e.g., from a fast clock process), whereas the moderate latency solution (e.g., of the clock solution module 44) may be referred to as a slow clock solution (e.g., from a slow clock process). A low latency clock module 42 or data processor 20 determines lower-latency satellite clock correction data 16 or delta clock adjustment to the slow satellite clock based on freshly or recently updated measurements of the collected raw phase measurements that are more current than a plurality of previous measurements of the collected raw phase measurements used for the slow satellite clock correction to provide lower-latency clock correction data 16. The lower-latency clock correction data 16 refers to aggregate, smooth clock correction data, with lower-latency than the slow clock solution, that contains contributions from the lower-latency satellite clock correction data and the slow satellite clock correction data.

The low-latency clock data or low-latency clock solution can refer to either or both of the following: (1) the clock data associated with the low-latency process, or (2) the final satellite clock solution that results from the an integrated solution based on the slow clock solution and the intermediate, low-latency solution. The low-latency clock data improves the accuracy of satellite clocks and reduces the latency (or increases the timeliness) of the final solution in real time, which is incorporated into correction data 16 for distribution to mobile receivers 12 or rovers.

In one embodiment, the slow clock process can utilize most or all possible measurements (e.g., carrier phase measurements from the reference data network 32 of reference receivers 30) to estimate a slow clock solution, but with a slow clock latency, slow clock delay or moderate latency (e.g., approximately 6 seconds to approximately 10 seconds) associated with: (1) the estimation, by the data processing center 18 and associated reference data network 32, of absolute satellite clocks, tropospheric bias, satellite narrow-lane bias and satellite narrow-lane ambiguity (e.g., refraction corrected narrow-lane ambiguity), or (2) the collection, by the data processing center 18 and associated reference data network 32, of raw phase measurements from the reference receivers 30, (3) both the above estimation and collection. In one embodiment, the slow clock solution is used to conduct ambiguity resolution and to estimate tropospheric bias and gradients per reference receiver to facilitate determination of a refraction correction for the clock narrow-lane ambiguity and respective narrow lane bias; the resolved ambiguities and/or estimated tropospheric bias from the slow clock process can be shared or used in the low-latency clock solution. For example, tropospheric bias can be estimated based on an a priori model and residual tropospheric bias estimation from the slow clock solution. The slow clock process supports collection and analysis of more measurements than the low-latency process to facilitate precise or absolute accuracy of clock estimates and more sophisticated slow clock models. In one embodiment, the slow clock process has greater data processing capacity or throughput requirements than the low-latency clock process, such that the computation of the slow clock solution can take approximately one to approximately two seconds, even if the data processing center 18 supports a parallel data processing environment.

Meanwhile, the low-latency clock process uses less of the measurements (e.g., carrier phase measurements from the reference data network 32) than the slow clock process and the low-latency process has a low-latency or low-latency clock delay (e.g., about one to two seconds) to collect or to collect and compute satellite clock change at a low-latency rate that is greater than the slow clock rate or moderate latency rate. The data processor 20 or the data processing center 18 integrates low-latency clock data with slow clock data and orbit data at low-latency rate to deliver a consistent, accurate and timely set of correction data 16.

Working together with the orbit solution and slow clock solution at a low-latency rate, the data processing center 18 can deliver a consistent set of correction data 16 including satellite orbit, clock (e.g., absolute clock estimate), wide-lane satellite bias, narrow-lane satellite bias and quality information in a timely manner (e.g., with reduced latency or low-latency with respect to the slow clock process). In particular, the data processing center 18 can deliver in real-time the correction data 16 to one or more mobile receivers with correction wireless device 14 through satellite signals (e.g., L-band signals) in FIG. 1A, through a wireless communications system 135 (in FIG. 1B), or through a wireless communications system 57 (in FIG. 3) (e.g., via Internet 56). In one embodiment, the correction data is delivered in real-time without material latency (between measurement time or raw phase measurements at the reference receiver 30 and availability of correction data at the mobile receiver 12) that would tend to degrade accuracy in position estimates of approximately five centimeter horizontal (e.g., pass-to-pass) accuracy or better with approximately ninety-five percent reliability with less than one standard deviation of variation at the mobile receiver 12.

In FIG. 1A, in one embodiment the system comprises a constellation of satellites (e.g., with satellite transmitters 10), including at least those satellites that are within view or reception range of one or more reference satellite receivers (e.g., reference GNSS receivers). In practice, reference receivers 30 (e.g., GNSS reference stations) are globally distributed at sites with good satellite geometry and visibility to a set of satellites.

Each reference receiver 30 has a digital portion of the receiver that comprises an electronic data processing system, which comprises an electronic data processor, a data storage device, data port and a data bus that supports communication between that data processor, data storage device and the data port. Further, the receiver comprises a measurement module for measuring one or more received satellite signals from navigation satellite transmitters 10. In one embodiment, the measurement module (e.g., carrier phase measurement module) is associated with the baseband or intermediate frequency processing or stored as software instructions in the data storage device within the digital portion of the receiver 30.

Each reference receiver 30 has a measurement module that measures observables, such as the carrier phase of one or more received satellite signals from each satellite. The measurement module of the reference receiver 30 may also measure the pseudo-range or code phase of a pseudo-random noise code that is encoded on one or more of the carrier signals. Further, a demodulator or decoder of the reference receiver 30 (e.g., stored as software instructions in the data storage device) can decode navigation messages, such as ephemeris data, that is encoded on the received satellites signals in conjunction with the pseudo-random noise code or otherwise. The reference receivers 30 receive and send measurements, ephemeris data, other observables and any information derived from the deliverables, to a data processing center 18, or hubs with similar processing capability, in real time.

In FIG. 1A, a group of reference receivers and communications links are referred to as a reference data network 32. In one embodiment, each reference receiver 30 transmits (e.g., via a communications link, a communications network, a wireless channel, a communications channel, communications line, a transmission line, or otherwise) a set of carrier phase measurements of received satellite signals, and associated satellite identifiers, and ephemeris data to an electronic data processing center 18 (e.g., reference data processing hub).

In one embodiment, the data processing center 18 comprises an electronic data processor 20, a data storage device 24, and one or more data ports 26 that are coupled to a data bus 22. The data processor 20, the data storage device 24 and the one or more data ports 26 may communicate with each other via the data bus 22. The software instructions and data that are stored in the data storage device 24 may be executed by the data processor 20 to implement any of the blocks, components or modules (e.g., electronic modules, software modules, or both) described in this disclosure document. The data processor 20 may comprise a microcontroller, a microprocessor, a programmable logic array, an application specific integrated circuit (ASIC), a digital signal processor, or another device for processing data, manipulating, accessing, retrieving, and storing data. A data storage device 24 may comprise electronic member, non-volatile electronic memory, an optical storage device, a magnetic storage device, or another device for storing digital or analog data on a tangible storage medium, such as an optical disk, a magnetic disk, or electronic memory. The data port 26 may comprise a buffer memory, a transceiver or both for interfacing with other network elements, such as a reference receiver 30 or a terrestrial satellite uplink station 28.

In one embodiment, the data processing center 18, data processor 20 or correction data estimator 34 receives the phase measurements and corresponding satellite identifiers from the reference receivers 30, reference receiver identifiers (or corresponding coordinates) and processes the phase measurements to estimate a clock bias for each satellite, or rather each satellite signal, or a corresponding clock solution for incorporation into correction data 16. For example, the correction data estimator 34 comprises software instructions or a module for determining the correction data 16 based on received phase measurements from the reference data network 32 or reference receivers 30. As illustrated in FIG. 1A, the clock solution, clock bias or correction data 16 is provided to a terrestrial uplink station 28 or another communications link. For example, the terrestrial uplink communicates or transmits the clock solution, clock biases or correction data 16 to a communications satellite 35 (e.g., repeater).

In turn, the communications satellite 35 is adapted to make the correction data 16 available or transmit the correction data 16 to a correction wireless device 14. The correction wireless device 14 is coupled to a mobile receiver 12 (e.g., mobile GNSS receiver or mobile satellite receiver) or rover. The mobile receiver 12 also receives satellite signals from one or more satellite transmitters 10 (e.g., GNSS satellites) and measures the carrier phase of the received satellite signals from the satellite transmitters 10. In conjunction with the phase measurements by the mobile receiver 12, the precise clock solutions or clock biases in the correction data 16 can be used by the mobile receiver 12 to estimate the precise position, attitude, or velocity of the mobile receiver 12, or its antenna. For example, the mobile receiver 12 may employ a precise positioning estimator, such as a precise point positioning (PPP) estimator, using precise clock and orbital solutions for the received signals of the satellite transmitters 10.

In this document, the method and real-time global navigation satellite system (GNSS) receiver navigation technique can achieve centimeter-level accuracy positioning, by using the real-time global differential correction data 16. This correction data 16 is available and valid globally through one or more of the following: (1) satellite communications (e.g., L-Band geostationary communication satellite) in FIG. 1A, (2) wireless communications system 135 (e.g., cellular communications) in FIG. 1B, or (3) wireless communications system 57 (e.g., cellular wireless system or WiFi system that is coupled to the Internet 56 for receipt of correction data 16 from a server 54. In comparison to local reference station correction (e.g., by a real-time kinematic (RTK) base station or certain wide-area corrections that do not adhere strictly to globally available PPP models), global differential correction eliminates the need for local reference stations and radio communication that would otherwise be used to establish short baselines (e.g., less than 20 kilometers to 30 kilometers) between a reference receiver 30 and a rover for precise position accuracy.

Figure 1B:
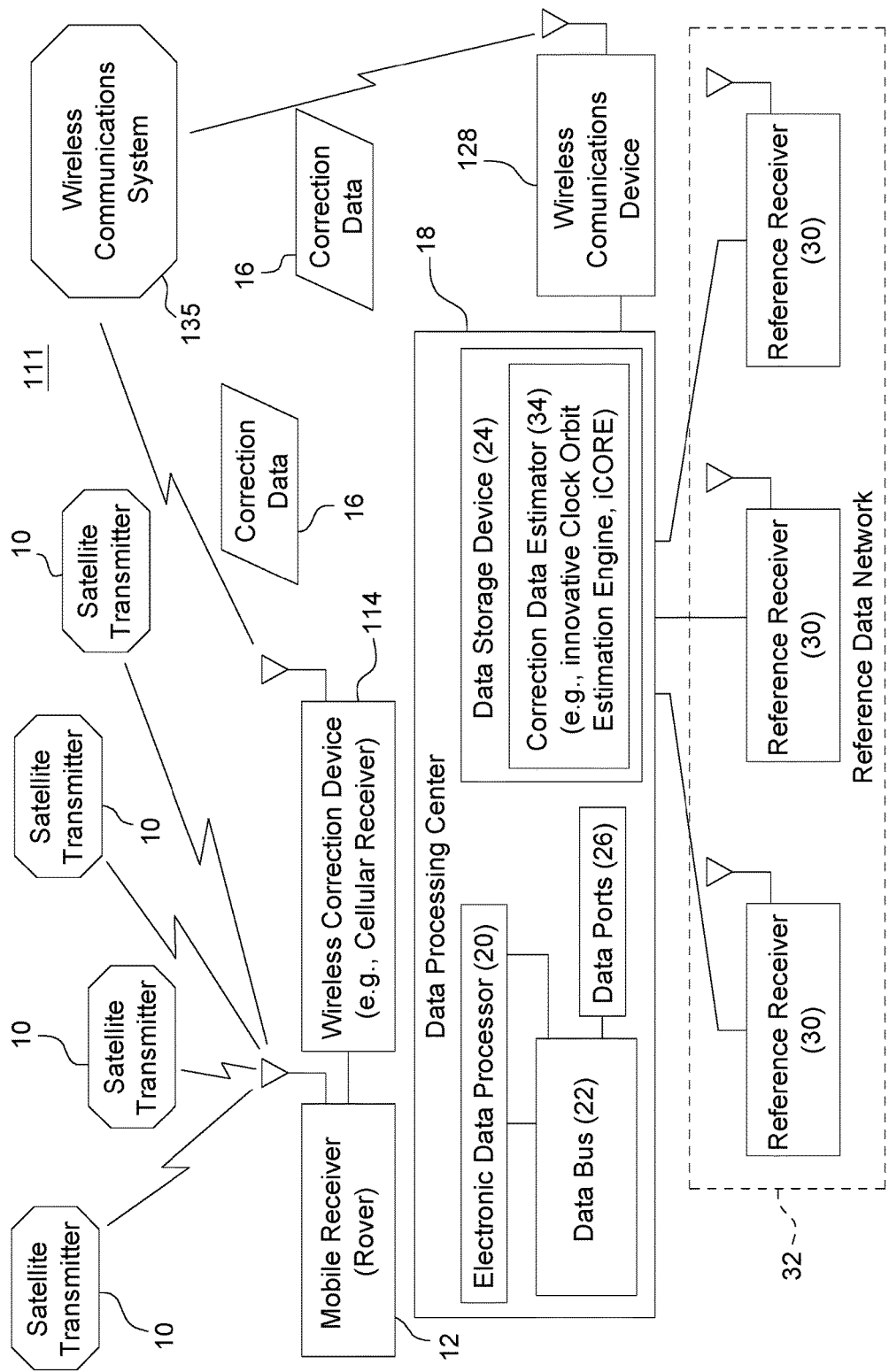
FIG. 1B is a block diagram of another embodiment of a system for providing a satellite correction signal with a precise, low-latency Global Navigation Satellite System (GNSS) satellite clock, where the satellite correction signal is provided via a wireless communications system.

The system of FIG. 1B is similar to the system of FIG. 1A, except the terrestrial uplink station 28, the communications satellite 35, and the correction wireless device 14 of FIG. 1A are replaced by the wireless communications device 128, the wireless communication system 135, and the correction wireless device 114 of FIG. 1B, respectively. Further, the correction wireless device 14 may comprise a satellite receiver, whereas the correction wireless device 114 may comprise a cellular transceiver, a wireless receiver, or another wireless communications device. Like reference numbers in FIG. 1A and FIG. 1B indicate like elements.

In FIG. 1B, the data processing center 18 or the correction data estimator 24 provides the correction data 16 to the wireless communications device 128, directly or indirectly through one or more communications networks (e.g., Internet), communications links, data packet networks, or communication channels. In turn, the wireless communications device 128 transmits the data to one or more wireless communications systems 135. If multiple wireless communication systems 135 are used, a communications network, communications link, data packet network, switched network, mobile telephone switching office, microwave links, communications lines, fiber-optic links, or communications channels may interconnect the wireless systems 136 to support communication of the correction data 16 from the wireless communications device 128 to the correction wireless device 114. Accordingly, the mobile receiver 12 obtains the correction data from the correction wireless device 114 with an acceptable level of latency.

Figure 2A:
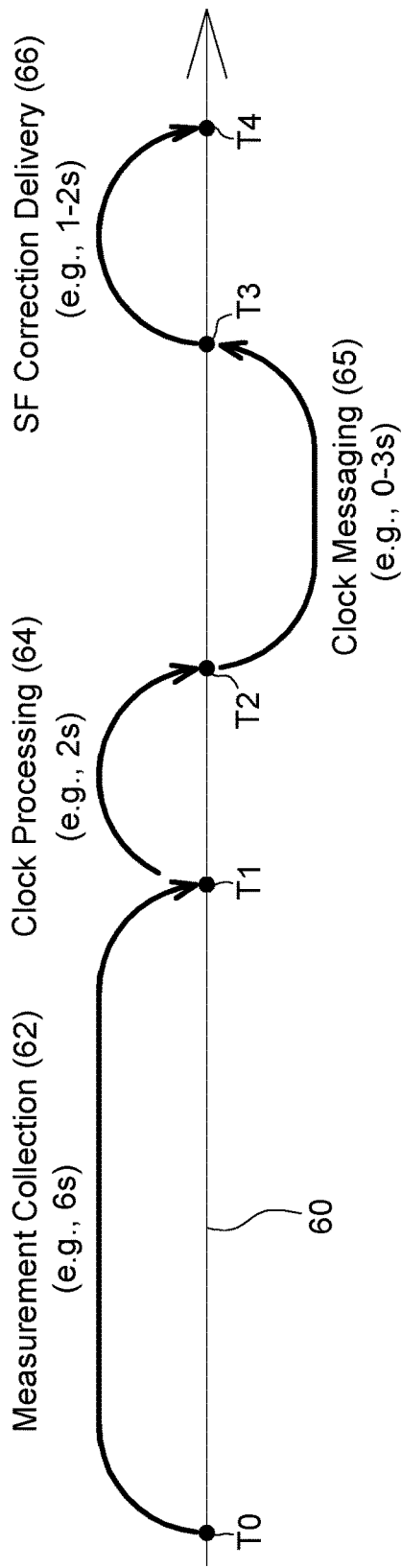
FIG. 2A is a diagram that illustrates the latency associated with the provision of the correction signal, and more particularly a correction signal with a set of clock errors for corresponding satellites, where the measurements are collected with a moderate latency.

FIG. 2A is a diagram that illustrates the latency associated with the provision of the correction signal, and more particularly a correction signal with a set of clock errors for corresponding satellites, where the measurements are collected with a moderate latency during a measurement collection time. FIG. 2A is a diagram that illustrates the latency time associated with the provision of the correction signal, and more particularly a correction signal with correction data 16, which can include a set of clock errors for corresponding satellites. The latency time is measured along the horizontal axis 60. The correction latency is one of the critical factors to impact overall system performance in providing a GNSS correction data service to end users or subscribers. For example, the correction latency can be defined as the time difference between the a measurement epoch at a reference receiver 30 or set of reference receivers 30 (or pre-processing completed epoch in the measurement preprocessing module 37 for the set of reference receivers) of processed measurements from the reference data network 32 and a reference epoch of the applied correction data 16 in one or more mobile receivers 12. In one embodiment, the correction latency of the correction data 16 or correction signal is a composition of three basic sources: (1) the measurement collection time period 62 (e.g., from T0 to T1) for the reference receiver 30 measurements (e.g., GNSS data from the reference receivers 30, which may be geographically located globally) to arrive at the data processing center 18 (or server); (2) the processing time period or clock estimation processing time period 64 (e.g., from T1 to T2 or T1 through T3) by the data processing center 18; and (3) the correction delivery time period 66 (e.g., T3 to T4) to deliver to the final user at the mobile receiver 12.

In an alternate embodiment, an additional source of delay is the clock messaging time period 65 (e.g., T2 to T3) between the processing time period and the correction delivery time period.

As illustrated in FIG. 2A, a first delay or measurement collection time 62 is between a measurement time at the reference receiver 30 or set of reference receivers 30 and receipt time at the electronic data processing center 18. The first delay is associated with factors such as the distance between the sites of reference receivers 30 and the data processing center 18 and the propagation delay associated with the transmission of electrical or electromagnetic signals between the reference receivers 30 (at different sites, possibly throughout the world) and the data processing center 18. In certain embodiments, the first delay may include pre-processing time for position estimates, ambiguities, tropospheric delay, atmospheric delay, clock bias, receiver bias or other pre-processing estimates provided by one or more reference receivers 30, or by the measurement pre-processing (MPP) module 36, or both the reference receivers 30 and the MPP module 36. For example, the carrier phase measurements and code phase measurements from the reference data network 32 are collected and pre-processed when they arrive at the data processing center 18.

The data processing center 18 can adjust the measurement collection time period 62 within certain bounds to favor accuracy or speed. The longer time that the data processing center 18 waits to collect the measurement data (and pre-processed data) from the reference network 32 prior to processing the measurement data, the more measurements the data processing center 18 can collect to support improved accuracy of orbit, clock and satellite bias, and reliability of network ambiguity resolution. However, if the measurement collection time period 62 exceeds a maximum threshold or is too long, the long data collection time can degrade the accuracy of the correction data 16 because it will be stale or outdated when it is finally received at the mobile station 12 and because other delays or latencies besides the measurement collection time must be considered in evaluating whether the correction data 16 is stale or sufficiently timely at the mobile station 12.

A second delay or clock processing time period 64 is between the receipt at the data processing center 18 and the processing time at the data processing center 18, which may be impacted by the throughput capacity or capability of the data processor 20, the clock speed of the data processor 20, the specifications or operations performed per time unit of the data processor 20. The processing time of the data processing center 18 or the correction data estimator 34 (e.g., Innovative Clock Orbit Real-time Estimator (iCORE)) has to be minimized as much as possible in order to allow the data processor 20 to output the correction data 16 at 1 Hertz (Hz) rate or greater, and to minimize the final correction latency at the rover side.

The third delay or clock messaging time period 65 is associated with the time between completion of data processing by the data processor 20 at the data processing center 18 and transmission of the data to the terrestrial uplink station 28, the communications satellite 35, or other communications device (e.g., wireless communications network). The fourth delay or correction delivery time period 66 is associated with delivery of the correction data 16 message from the communications satellite 35 or other communications device, for example. Although the first delay (62) is listed as approximately six seconds in FIG. 2A; the second delay (64) as listed as approximately two seconds; the third delay (65) is listed as approximately zero to three seconds, and the fourth delay (66) is listed as approximately one to two seconds; the other durations of the delay are possible and can fall within the scope of the claims. Because of the limits of satellite channel bandwidth (e.g., L-band bandwidth) and propagation delays with geo-synchronous satellites, it takes some time (e.g., approximately 4 seconds) to deliver the full-set of corrections to a mobile receiver 12 or rover from the data processing center 18. In accordance with certain models of position accuracy, every additional second delay of clock corrections above a target aggregate latency (e.g., from measurement time to receipt time at the rover) or target latency range can degrade up to five percent path-to-path accuracy for rover navigation.

Figure 2B:
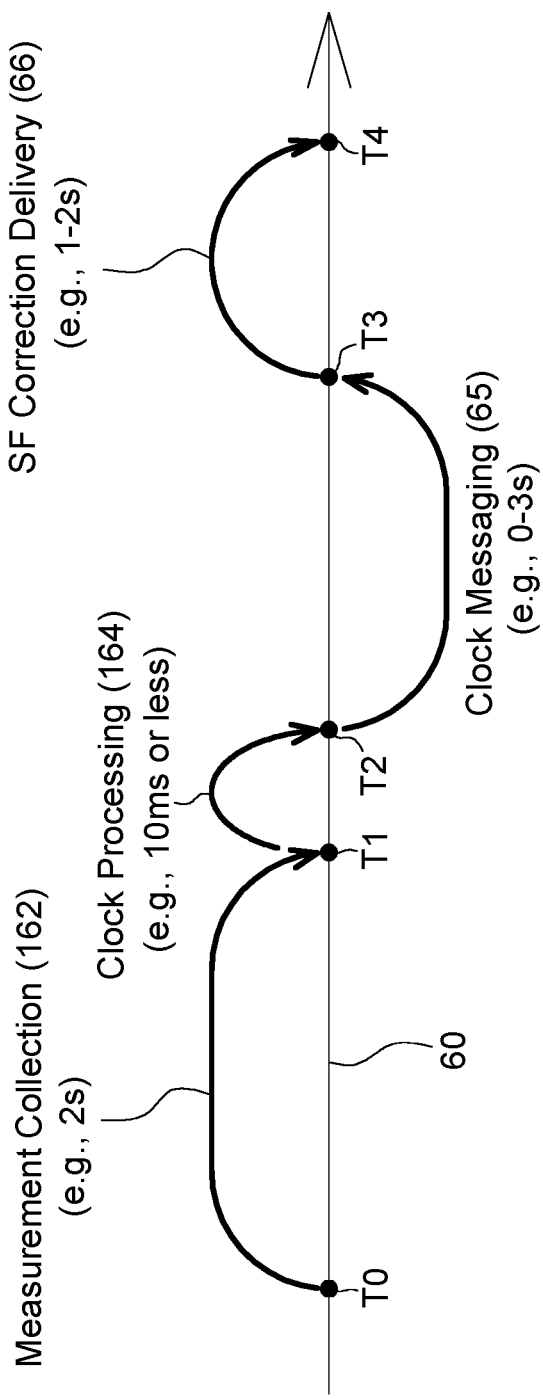
FIG. 2B is a diagram that illustrates the latency associated with the provision of the correction signal, and more particularly a correction signal with a set of clock errors for corresponding satellites, where the measurements are collected with a lower latency than the measurements of FIG. 2A.

FIG. 2B is a diagram that illustrates the latency associated with the provision of the correction signal, and more particularly a correction signal with a set of clock errors for corresponding satellites, where the measurements are collected with a lower latency than the measurements of FIG. 2A. FIG. 2A is similar to FIG. 2B, except the first delay 162 and the second delay 164 of FIG. 2B are shortened compared to the first delay 62 and the second delay 64, respectively, of FIG. 2A. Like reference numbers in FIG. 2A and FIG. 2B indicate like elements.

As illustrated in FIG. 2B, the first delay 162 or measurement collection time is analogous to the first delay 62 of FIG. 2A, except the first delay 162 has a duration of approximately two seconds or less. The first delay 162 can be reduced from the first delay 62 by one or more of the following factors: (1) collecting the measurement data from a set of reference receivers 30 over a shorter period of time, (2) disregarding, by the data processing center 18, measurement data from satellites, satellite signals, or reference receivers that do not pass quality checks or statistical analysis, such as standard deviations of the ambiguity resolutions for wide-lane ambiguities, narrow-lane ambiguities or refraction-corrected ambiguities at one or more reference receivers 30, and (3) enhancing the throughput capacity or data processing capacity of the data processing center 18 via higher clock speeds, parallel data processing, improved efficient software instructions within the correction data estimator 34, or the like.

Similarly, the second delay 164 or clock processing time is analogous to the second delay 64 of FIG. 2A, except the second delay 164 has a duration of approximately ten milliseconds or less. The second delay 164 can be reduced from the second delay 64 by one or more of the following factors: (1) collecting the measurement data from a set of reference receivers 30 over a shorter period of time, (2) disregarding, by the data processing center 18, measurement data from satellites, satellite signals, or reference receivers that do not pass quality checks or statistical analysis, such as standard deviations of the ambiguity resolutions for wide-lane ambiguities, narrow-lane ambiguities or refraction-corrected ambiguities at one or more reference receivers 30, and (3) enhancing the throughput capacity or data processing capacity of the data processing center 18 via higher clock speeds, parallel data processing, improved efficient software instructions within the correction data estimator 34, or the like.

Figure 3:
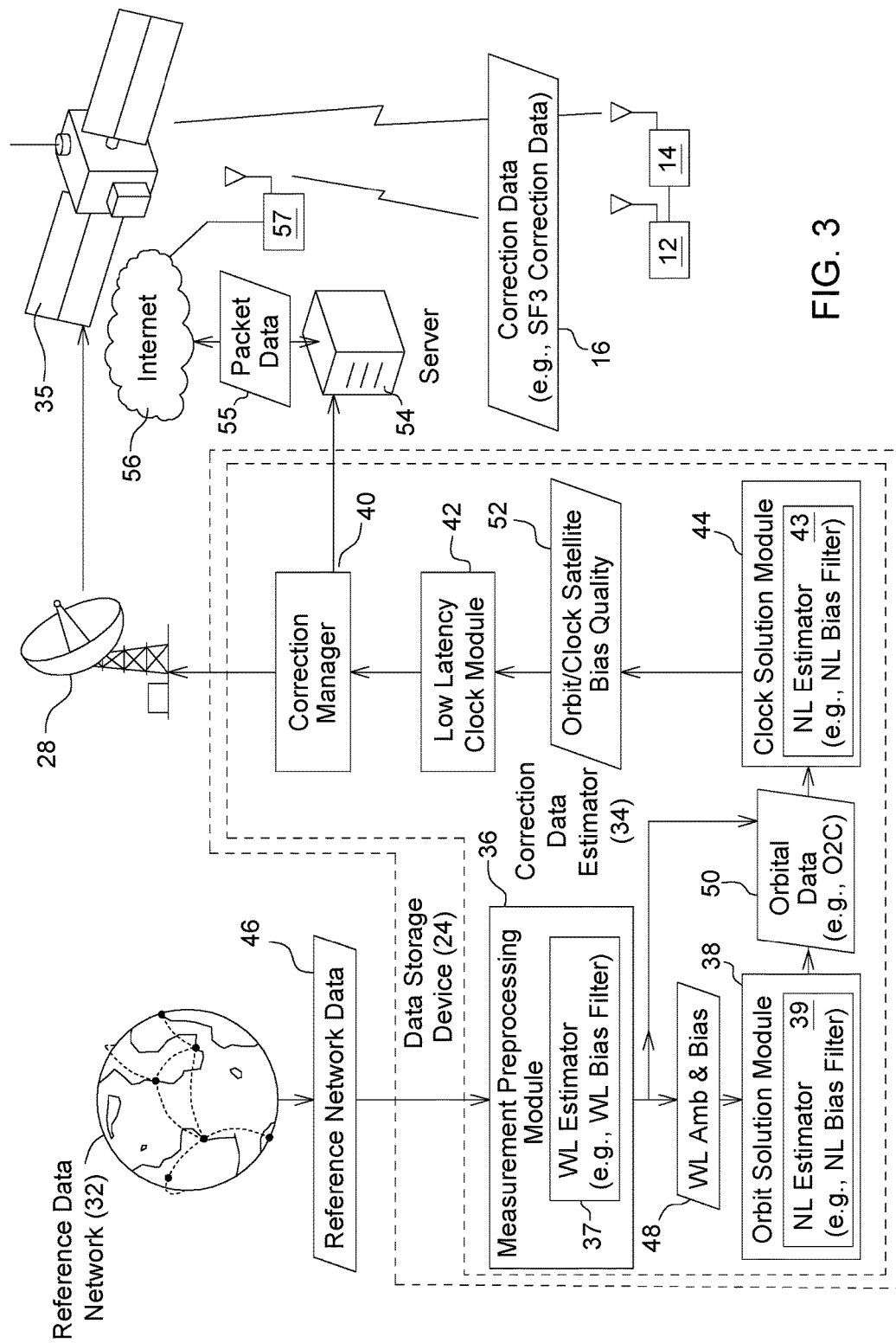
FIG. 3 is a block diagram of another embodiment of a system for providing a satellite correction signal with a precise, low-latency Global Navigation Satellite System (GNSS) satellite clock

FIG. 3 is a block diagram of another embodiment of a system for providing a satellite correction signal with a precise, low-latency Global Navigation Satellite System (GNSS) satellite clock. The system of FIG. 3 is similar to the system of FIG. 1A or FIG. 1B, except the data storage device 24 stores or supports a correction data estimator 34 and two alternative paths for flow of the correction data 16 to the end user of the mobile receiver 12 are provided. Like reference numbers in FIG. 1A, FIG. 1B and FIG. 3 indicate like elements.

The correction data estimator 34 (e.g., Innovative Clock Orbit Real-time Estimator (iCORE)) comprises a module or software instructions that can be executed by the data processor 20 for providing correction data 16 as output based on the input of carrier phase measurements and associated data from one or more reference receivers 30. The associated data may comprise data such as satellite identifiers, satellite signal identifiers (e.g., frequency or band), or ephemeris data associated with the received satellite signals, reference station identifiers (e.g., or reference station coordinates), measurement time stamps associated with the measured carrier phase, among other ancillary data. Further, in other embodiments, the associated data may comprise pre-processing data, resolved wide-lane ambiguities, resolved narrow-lane ambiguities, or resolved refraction-corrected ambiguities for any reference receiver 30 or reference station with a known or fixed location (e.g., three dimensional coordinates).

The correction data estimator 34 generates correction data 16 that enable ambiguity resolution on one or more mobile receivers 12 or rovers that receive the correction data 16 via a correction wireless device. The correction data estimator 34 employs an innovative ambiguity resolution algorithm for the generation of the low-latency clock data and satellite biases. For example, the architecture of the correction data estimator 34 or data processing center 18 is well suited to support processing measurement data (and associated pre-processing data) of many (e.g., one hundred or more) reference receivers 30 or reference stations, including all necessary computation such as measurement pre-processing, orbit and clock determination, ambiguity resolution and the final correction data 16 generation, within a fraction of second.

In one embodiment, the correction data estimator 34 comprises an measurement pre-processing (MPP) module 36, an orbit solutions module, a clock solution module 44, a low latency clock module 42, and correction distribution module to provide global differential correction data 16. In one embodiment, the measurement pre-processing (MPP) module 36 receives reference network data 46 from the reference data network 32 of one or more reference satellite receivers. The reference network data 46 may comprise one or more of the following: raw measurements, raw carrier phase measurements from each reference satellite receiver, raw code phase measurements from each reference satellite receiver, a reference satellite receiver identifier, a reference receiver 30 position offset or position offset vector from its known position, a phase offset corresponding to the reference receiver 30 position offset, atmospheric bias data, satellite bias data, receiver bias data, receiver clock bias data, satellite clock bias data, or other data. Raw measurements can refer to raw carrier phase measurements from one or more reference satellite receivers, or raw code phase measurements from one or more reference satellite receivers, or both.

In one embodiment, the correction data estimator 34 can generate correction data 16 or correction signals in real-time based on the reference network data 46 or collected measurement data from the reference data network 32, where the correction data 16 are generated to provide centimeter-level accuracy estimates including: (1) satellite orbit estimate, (2) satellite clock estimate, and (3) satellite phase biases and their quality information.

In one embodiment, the measurement pre-processing module 36 accepts reference network data 46 as input data and applies the wide-lane estimator 37 (e.g., Ambiguity Resolution Estimator (ARE)) to output wide-lane ambiguities and corresponding wide-lane bias. For example, the pre-processing module 36 or the wide-lane estimator 37 (e.g., wide-lane filter or Kalman filter) may output fixed wide-lane ambiguities and associated wide-lane bias (48).

The measurement pre-processing module 36 communicates the wide-lane ambiguity and corresponding wide-lane bias data to the orbit solution module 38 and the clock solution module 44. The orbit solution module 38 receives the input of the wide-lane ambiguities and corresponding wide-lane bias data and applies an orbit narrow-lane estimator 39 (e.g., narrow-lane ARE (Ambiguity Resolution Estimator)) to provide predicted satellite orbital data 50 (e.g., O2C data) output. The predicted satellite orbital data 50 can be used to correct orbital errors in the slow clock and low-latency solutions, and to generate orbit correction signals for incorporation into the correction data 16 to be provided to end users.

The orbit solution module 38 communicates the predicted satellite orbital data to the clock solution module 44. The clock solution module 44 receives the input of the predicted satellite orbital data 50, and the wide-lane ambiguities and associated wide-lane bias (48). The clock solution module 44 applies the clock narrow-lane estimator 43 (e.g., narrow-lane (Ambiguity Resolution Estimator), narrow-lane filter, or Kalman filter) and outputs the predicted orbital data 50, clock satellite bias data, and satellite bias quality data (52). For example, in one embodiment, the clock solution module 44 outputs one or more of the following: predicted orbital data, clock satellite bias data, satellite bias quality data, satellite slow clock corrections, satellite wide-lane bias corrections, and satellite narrow-lane bias corrections.

The low latency clock module 42 communicates with the clock solution module 44 to receive the predicted orbital data 50, clock satellite bias data, and satellite bias quality data (52), where the clock satellite bias data can comprise satellite wide-lane bias corrections, and satellite narrow-lane bias corrections. Further, in one embodiment, the low latency clock module 42 receivers satellite slow clock corrections. The low latency clock module 42 outputs low-latency correction data 16 including one or more of the following: low-latency precise satellite orbital correction data 50 for corresponding satellites, low-latency precise clock data for corresponding satellites, wide-lane satellite bias, and narrow-lane satellite bias. In one embodiment, the low-latency data is provided at a greater data transmission rate than similar higher-latency data provided by the clock solution module 44, where the low-latency data is updated on a regular basis commensurate with the greater data transmission rate to provide accurate and current correction data 16.

In certain configurations, the data processing center 18 can communicate via communication links with one or more secondary data processing hubs (not shown) that are geographically distributed (e.g., on a global basis), where each secondary data processing hub is configured with hardware and software similar to the data processing center 18 with a correction data estimator 34 and where the data processing center 18 can control the secondary data processing hub or hubs.

For example, the correction manager 40 can select correction data 16 (e.g., the best correction data 16 or most reliable correction data 16) provided by the data processing center 18, alone, or in combination with one or more secondary data processing hubs for distribution to end users. Further, the correction manager 40 can select the geographic scope of the measurement data or the identity of the satellites (e.g., outlier or unreliable measurements from malfunctioning satellites can be ignored) to be used in the correction data 16 that is distributed to end users via satellite or wireless communications system 57.

The correction manager 40s is capable of monitoring the correction data 16 for error correction and distributing the data to end users or subscribers of the data correction data 16 service. The correction manager 40 may distribute the correction data 16 via a satellite communications network, a wireless network (e.g. WiFi, 802.11, or cellular network), or both. A broadcasting system is capable of delivering the best of the global differential corrections to user receiver from multiple correction generation servers 54, such as the data processing center 18 and one or more secondary data processing hubs. For example, the set of global differential correction can be chosen and uplinked to INMARSAT communication satellite via Land-Earth Station (LES) as illustrated in FIG. 3.

The correction manager 40 is capable of communicating or distributing correction data 16 to the satellite uplink communications device or distribution of the satellite data via the satellite communications network. In turn, the satellite uplink communications device provide a signal to a communications satellite 35 with a transceiver, a combination of a transmitter and receiver to communicate correction data 16 via an electromagnetic or satellite signal (e.g., L-band signal) to mobile receiver 12s or rovers equipped with a correction wireless device 14. In certain embodiments, the electromagnetic or satellite signal with the correction data 16 may be encrypted or encoded such that only subscribers or licensees can access, decode or decrypt the correction data 16, or certain precision levels of the correction data 16 (e.g., SF3 correction data 16).

The correction manager 40 is capable of communicating or distributing correction data 16 to a server 54 that has access to an electronic communications network, such as the Internet 56. For example, the server 54 may comprise a computer that accesses the Internet 56 via an Internet service provider to enable the correction data 16 to be communicated in one or more data packets 55 (e.g., Internet Protocol data packets). The data packets may be processed by a wireless communications network 57, such as WiFi wireless system, a local wireless network, a wide area wireless network, or a cellular communications system via a correction wireless device 14, which may comprise a smartphone, a WiFi-enabled communications transceiver, or another device for receiving the correction data 16 and providing the received correction data 16 to the mobile receiver 12 or rover. As in the case of the satellite signal with the correction data 16, the correction data 16 transmitted by the server 54, the data packets 55 or both may be encrypted or encoded such that only subscribers or licensees can access, decode or decrypt the correction data 16, or certain precision levels of the correction data 16.

The mobile receiver 12 of the end user is capable of receiving the correction data 16, which includes a global differential corrections. The mobile receiver 12 or rover is capable of resolving ambiguity based on the received correction data 16 and achieving centimeter-level navigation.

Figure 4:
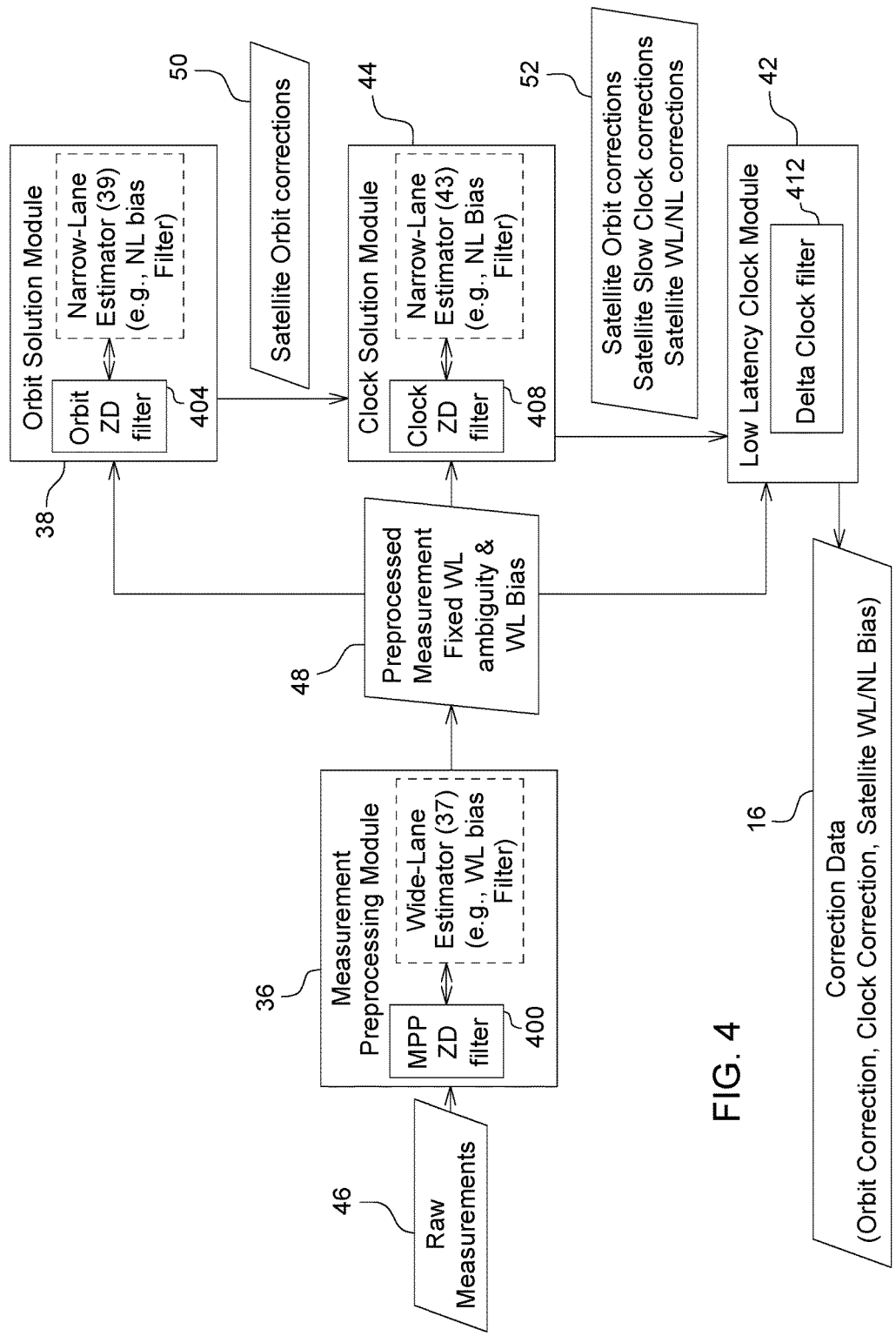
FIG. 4 shows an illustrative example of the correction data estimator of FIG. 3 in greater detail.

FIG. 4 shows an illustrative example of the correction data estimator 34 of FIG. 3 in greater detail. Like reference numbers in FIG. 3 and FIG. 4 indicate like elements, modules or features.

The correction data estimator 34 comprises a measurement pre-processing module 36, an orbit solution module 38, a clock solution module 44 and low-latency clock module 42. The measurement pre-processing (MPP) module prepares "clean" measurements and provides wide-lane fixed ambiguities and wide-lane bias products for use by the correction data estimator 34 and its other modules. The orbit solution module 38 provides accurate satellite position and velocity estimates to assist in proper geometric estimates or range estimates between a particular reference receiver 30 an corresponding satellite. The orbit solutions or precise orbital data is provided for use by the correction data estimator 34 and the its other modules. The clock solution module 44 provides a satellite slow clock solution estimate and narrow-lane bias products at a low rate, slow clock rate, or a slow update rate. The low latency clock module 42 provides fast satellite clock estimate at a low-latency update rate (e.g., approximately 1 Hertz (Hz) or greater), fast rate, or a fast update rate, which is greater than the slow clock rate. Further, the low-latency module integrates, manages and communicates the state data and filter results for sharing among the ambiguity resolution filters to enable the MPP module, orbit solution module 38 and slow clock solution module 44 to output or generate a set of consistent correction data 16 or signals in real-time.

Each one of the MPP module, the orbit solution module 38 and clock solution module 44 comprises two parts: (1) zero-difference filter and (2) an network ambiguity resolution module or filter. In one embodiment, each zero-Differential (ZD) filter (e.g., Kalman filter) does one or more of the following: (a) processes ZD measurements, (b) defines or forms state variables for the ZD filter, (c) and performs or processes update and/or dynamic update of the ZD filter (e.g., based on the defined state variables and states). In one embodiment, the network ambiguity resolution estimation (ARE) module performs or conducts ambiguity resolution by one or more predictive filters, such as wide-lane estimator 37 (e.g., wide-lane filter), a narrow-lane estimator 39 (e.g., narrow-lane filter), or another predictive filter (e.g., Kalman filter). The network ambiguity resolution estimation module is capable of resolving wide-lane and narrow-lane ambiguities. Different ZD filter and ARE modules (e.g., wide-lane estimator 37 (e.g., wide-lane filter)s, narrow-lane estimator 39 (e.g., narrow-lane filter)s or both) as used for different modules, such as MPP module, the orbit solution module 38 and clock solution module 44, because the update rates and data states of the different modules can be different.

In one embodiment, low latency clock module 42 can only use the carrier phase measurements to derive clock change between two different epochs. In order to improve computation efficiency, the double differencing approaches between time and satellites are used to reduce size of estimated states, such as ambiguity states and receiver clocks estimates. The tropospheric biases are corrected using a prior model and residual troposphere bias estimation from slow clock solution. The low latency clock module 42 estimates satellite clock changes, not reference receiver 30 clock changes. The computation by the data processing center 18 is extremely efficient. For example, if the data processing center 18 is implemented on a state-of-the art desktop computer at the time of filing of this disclosure, the data processing center 18 can take a few milliseconds to finish processing all the measurements of many sites or reference receivers 30 (e.g., sixty or more reference receivers 30) for any epoch.

Measurement Pre-Processing Module

As illustrated, the measurement pre-processing module 36 further comprises a measurement pre-processing zero-difference filter 400 and a network wide-lane ambiguity resolution estimator (e.g., wide-lane estimator 37 (e.g., wide-lane filter)). The measurement pre-processing zero-difference filter 400 supports precise point positioning (PPP). An optional measurement pre-processing zero-difference filter 400 can be used to determine undifferenced or zero-differenced (ZD) ambiguity states or float ambiguity states associated with the raw carrier phase measurements (e.g., L1 raw carrier phase, L2 carrier phase, wide-lane difference of L1/L2 combination of carrier phase) for one or more of the reference receivers 30 in the reference data network 32. The zero-difference filter is illustrated in dashed lines in FIG. 4 to show that the zero-difference filter is optional and may be included within the wide-lane estimator 37 (e.g., wide-lane filter) in alternate embodiments. For example, the zero-differenced ambiguity state can be determined based on correction data 16 that contains satellite bias information from a network or group of reference receivers 30.

At regular intervals or sampling intervals after the measurement pre-processing module 36 receives the raw measurements from each reference receiver 30 of reference data network 32, the measurement pre-processing module 36 processes, preprocesses and "cleans" the measurements, and resolves the wide-lane (WL) ambiguities associated with the received carrier phase measurements for each satellite within view of each reference receiver 30. The measurement pre-processing module 36 provides support for both the orbit/clock solution and the low-latency clock by providing the "cleaned" carrier measurements, along with respective fixed wide-lane ambiguities, and respective satellite WL biases.

In one embodiment, the measurement pre-processing module 36 uses the Melbourne-Wübbena linear combination as zero-difference (ZD) measurement to estimate the following state variables:

1) ZD float WL ambiguity per visible satellite and reference site (reference receiver 30) which combines receiver wide-lane bias and WL integer ambiguities.
2) One wide-lane bias per satellite.
3) One GLONASS IFB WL coefficient per tracked site.

With the use of the ZD float WL ambiguity as a constraint or search-limiting constraint for a wide-lane estimator 37 (e.g., wide-lane filter) (e.g., Kalman filter), the measurement pre-processing module 36 or is wide-lane estimator 37 (e.g., wide-lane filter) resolves the WL ambiguity in double-difference (DD) and single difference (SD) form, where the receiver WL bias is cancelled.

In an alternate embodiment for a reference receiver 30 that tracks GLONASS satellites, the measurement pre-processing module 36 determines GLONASS IFB WL coefficient per tracked site, where sensitivity coefficient of the GLONASS IFB WL coefficient is the satellite frequency number. This state variable only exists for GLONASS case and not for other GNSS systems, like GPS.

In order to make the computation effective, the measurement pre-processing module 36 averages the ZD Melbourne-Wübbena measurements for each site at an interval such as 60 seconds if there is no cycle slip detected. For example, the reference receiver 30 comprises a cycle slip detector to detect a carrier cycle slip in the carrier phase measurements for each received signal from a given satellite or minimum set of satellites (e.g., five satellite) necessary to reliably track the three dimensional position of the reference receiver 30. For each sampling interval, the measurement pre-processing module 36 or ZD filter (e.g., ZD Kalman filter) processes the smoothed ZD Melbourne-Wübbena measurements on a site-by-site basis. At each measurement update interval, the ZD Kalman filter dynamic update and measurement update is processed to update state variables.

In an alternate embodiment, GPS and GLONASS systems have two separate wide-lane estimator 37 (e.g., wide-lane filter)s associated with the measurement pre-processing module 36. The reference receiver 30 bias is not a desirable global differential product because the reference receiver 30 bias is not used for user receiver navigation. Accordingly, in order to reduce filter size and computation complexity, the reference receiver 30 WL bias is not explicitly estimated and combined into the ZD float ambiguity state instead.

In particular, the pre-processing module 36 or network wide-lane ambiguity filter uses zero-differenced (ZD) Melbourne-Wübbena linear combination in Equation (1) as the input measurement to estimate one wide-lane floating ambiguity state per visible satellite. The wide-lane satellite bias can be broadcast in real-time within correction data 16 32 or correction signals to mobile receiver 12s and will compensate for that term using Equation (2).

In one embodiment, the wide-lane estimator 37 (e.g., wide-lane filter), which can be applied to PPP determination, uses the following equations described below. Given the code and phase measurements from two frequencies, such as L1 and L2 for GPS, G1 and G2 for GLONASS, the Melbourne-Wübbena linear combination $L_{WL}^j$ can be formed as shown below.

$$L_{WL}^j = \left(\frac{f_1}{f_1+f_2}P_1^j + \frac{f_2}{f_1+f_2}P_2^j\right) - \left(\frac{f_1}{f_1-f_2}L_1^j - \frac{f_2}{f_1-f_2}L_2^j\right) \quad (1)$$

By expanding the above equation (1), it can be shown that the geometric range related terms, which include range, receiver and satellite clock, ionosphere and troposphere errors and the phase wind-up term, are cancelled. It can be expressed in Equation (2) as $$L_{WL}^j = N_{WL}^j \lambda_{WL} + b_{WL} + B_{WL}^j + IFB^j + \varepsilon_{WL}^j \quad (2)$$

where:
$\lambda_{WL}$ is wide-lane wavelength, about 86.4 cm for GPS and c is speed of light, $$\lambda_{WL} = \frac{c}{f_1 - f_2}; \quad (3)$$

$N_{WL}^j$ is integer wide-lane ambiguity for satellite j, $$N_{WL}^j = N_1^j - N_2^j; \quad (4)$$

$b_{WL}$ is wide-lane receiver bias (one per receiver and constellation for all visible satellites), which is a combination of L1 and L2 receiver code bias and phase bias, as indicated in Equation (5):

$$b_{WL} = \left(\frac{f_1}{f_1+f_2}b_{P_1} + \frac{f_2}{f_1+f_2}b_{P_1}\right) - \left(\frac{f_1}{f_1-f_2}b_{L_1} - \frac{f_2}{f_1-f_2}b_{L_2}\right), \quad (5)$$

where majority of GLONASS inter-frequency bias $b_{P_1}$ and $b_{P_2}$ in code measurement is usually assumed to be linear or a trigonometric function of the GLONASS satellite frequency number; it is not the same for all the visible satellite as with the case of CDMA signals such as GPS;
where $IFB^j$ is the inter-frequency bias for satellite j, such as for a GLONASS satellite;

where $B_{WL}^j$ is wide-lane satellite j bias (one per satellite); and
where $\varepsilon_{WL}^j$ is the wide-lane measurement error for satellite j including white noise, multipath and remaining un-modeled errors.

With respect to the inter-frequency bias per satellite, the linear model can be approximated below for GLONASS constellation as Equation (6):

$$IFB^j \approx k \cdot n^j \quad (6)$$

where k is the IFB coefficient for receiver code bias. The IFB varies from receiver to receiver, also varies from one siting (antenna and cabling setup) to another siting. Modelled in this way, typically k is less than 0.1.

The wide-lane satellite j bias, $B_{WL}^j$, (one per satellite) is a combination of L1 and L2 satellite code bias and satellite phase bias as in Equation (7); the satellite bias is changing slowly over time; both satellite and receiver wide-lane biases are not constant over time:

$$B_{WL}^j = -\left(\frac{f_1}{f_1+f_2}B_{P_1}^j + \frac{f_2}{f_1+f_2}B_{P_2}^j\right) + \left(\frac{f_1}{f_1-f_2}B_{L_1}^j - \frac{f_2}{f_1-f_2}B_{L_2}^j\right) \quad (7)$$

where $B_{P_1}^j$ is satellite bias for satellite j of the code phase or pseudo-range signal encoded on frequency L1 ($f_1$), where $B_{P_2}^j$ is satellite bias for satellite j of the code phase or pseudo-range on frequency L2 ($f_2$), where $B_{L_1}^j$ is satellite bias for satellite j of the carrier phase on frequency L1, where $B_{L_2}^j$ is satellite bias for satellite j of the carrier code on frequency L2.

Orbit Solution Module

The orbit solution module 38 relates to orbit determination. In the correction data estimator 34, the other major modules including slow clock estimation module and low latency clock module 42 do not estimate satellite orbits. The other modules totally rely on the predicted orbits over a corresponding valid orbit time period (e.g., few minutes) from the orbit solution. The orbit solution module 38 runs at an orbital correction rate or a lower rate such as 300 seconds per iteration or update of orbit solutions since the GNSS satellite orbits are smooth. In the correction data estimator 34, the modules including the measurement pre-processing module 36, the orbit module, clock module and low latency clock module 42 can run in parallel.

The orbit solution uses the refraction-corrected code and carrier phase measurements from global reference station network. There are three types of state variables to be considered in the orbit solution module 38 and its associated filters, such as the orbit zero-difference filter 404 and the network NL filter for ambiguity resolution:

1) Satellite-dependent state variables including satellite position, velocity, satellite clock, satellite narrow-lane bias, yaw rate and empirical solar radiation force modeling parameters.
2) Receiver-dependent state variables including reference position, receiver clocks, residual troposphere bias and gradients, carrier phase ambiguities.
3) Common-state variables including Earth Orientation parameters such as polar motion and UT1-UTC.

In order to provide global differential positioning services, such as STARFIRE™ correction data 16 services, the precise satellite clocks and orbits have to be estimated and delivered to end-user receivers in real-time. STARFIRE correction data 16 services is a trademark of Deere & Company of Moline, Ill. Typically, predicted satellite orbits (e.g., called O2C data) over a few minutes are considered known in the clock estimation because the errors of these predicted orbits are rather small and stable and can even be absorbed by the estimated clocks. The correction data estimator 34 can use the predicted orbital data to correct orbital errors in slow clock solutions and low-latency solutions and to generate correction data 16 in real-time.

In one embodiment, the orbit solution module 38 may comprise an orbit zero-difference filter 404 and a network narrow-lane ambiguity resolution estimator (ARE). With the benefit of the results (e.g., float ambiguity states) of the pre-processing zero-difference filter 400, the orbit zero-difference filter 404 can be used to determine undifferenced or zero-differenced (ZD) ambiguity states or float ambiguity states associated with the raw carrier phase measurements (e.g., L1 raw carrier phase, L2 carrier phase, wide-lane difference of L1/L2 combination of carrier phase, or narrow-lane difference of L1/L2 combination of carrier phase) for one or more of the reference receivers 30 in the reference data network 32.

With the benefit of the undifferenced or zero-differenced (ZD) ambiguity states or float ambiguity states associated with the raw carrier phase measurements or narrow-lane difference of the raw carrier phase measurements and the resolved WL ambiguities provided by the measurement pre-processing module 36, the network narrow-lane ambiguity estimator (in association with the orbit solution module 38) can estimate narrow-lane ambiguities (e.g., fixed integer NL ambiguities) or refraction-corrected narrow-lane ambiguities for one or more reference receivers 30 in the reference data network 32. The resolved WL ambiguities can be used as constraints in a search process or to assist the NL ambiguity estimator (e.g., NL filter) to converge rapidly upon a integer ambiguity solution for carrier phase measurements.

Clock Solution Module

In one embodiment, the clock solution module 44 may comprise an clock zero-difference filter 408 and a network narrow-lane ambiguity resolution estimator (ARE). With the benefit of the results (e.g., float ambiguity states) of the pre-processing zero-difference filter 400, the clock zero-difference filter can be used to determine undifferenced or zero-differenced (ZD) ambiguity states or float ambiguity states associated with the raw carrier phase measurements (e.g., L1 raw carrier phase, L2 carrier phase, wide-lane difference of L1/L2 combination of carrier phase, or narrow-lane difference of L1/L2 combination of carrier phase) for one or more of the reference receivers 30 in the reference data network 32. Although the ZD ambiguity float states and other filter states can be shared to the extent that the shared filter states are timely, clock ZD filter may operate at a different update rate for the states than the other ZD filters in the correction data estimator 34.

With the benefit of the undifferenced or zero-differenced (ZD) ambiguity states or float ambiguity states associated with the raw carrier phase measurements or narrow-lane difference of the raw carrier phase measurements and the WL ambiguities provided by the measurement-pre-processing module 36 to provide constraints, the network narrow-lane ambiguity estimator (in association with the clock solution module 44) can estimate narrow-lane ambiguities (e.g., refraction corrected, fixed integer NL ambiguities) for one or more reference receivers 30 in the reference data network 32.

Slow Clock Solution Module

All or most of the measurements (e.g., carrier phase measurements) from reference data network 32 are collected, pre-processed and are batched when they arrives at the data processing center 18. The longer time the data processing center 18 or the correction data estimator 34 waits, the more measurements are collected that are available for processing, but the longer the delay and the greater the potential that the clock solution could become stale by the time it reaches the mobile receiver 12s of the end users. In certain embodiments, the slow clock solution module 44 or the correction data estimator 34 typically estimates thousands of states for determination of clock solutions. For example, the data processing center 18 can take up to several seconds to finish the computation process for the slow clock solutions. In order to reduce the correction latency and utilize the more measurements, the correction data estimator 34 uses two clock solutions including slow clock and low-latency clock solution. In the slow clock solution module 44, all the measurements are batched as long as they arrived before a fixed latency, such as 6-15 seconds.

The slow clock solution module 44 measurements and the clock zero-difference (ZD) filter (e.g., ZD Kalman filter) use similar measurements as the orbit solution module 38, except for several major differences. First, the slow clock solution module 44 runs or provides updates to the slow clock solution at a different rate such as every 30 or 60 seconds. In contrast, the orbit solution module 38 runs or provides updates to the orbital data or orbit solution every 300 seconds because clock corrections vary more quickly than orbit corrections. Second, in the slow clock solution module 44, all or most of the state variables remain the same or similar to the counterpart sate variables in the orbit solution module 38, except the satellite-orbit-related states. The satellite-orbit-related states are not estimated, but use the orbit estimation results from orbit solution of the orbit solution module 38.

In one embodiment, the slow clock solution module 44 can output a complete set of global difference corrections or correction data 16 including one or more of the following corrections: satellite orbit corrections, satellite clock corrections, satellite WL biases, satellite NL biases and quality information. The slow clock solution module 44 can communicate correction data 16 and estimated tropospheric parameters to the low latency clock module 42. As used herein, "biases" that are not qualified as satellite or receiver biases will refer to satellite bias, such as satellite WL and NL biases. Reference receiver 30 bias is not of interest to global differential correction product and thus not solved for in the reference receivers 30, whereas mobile receiver 12 bias can be addressed in the mobile receiver 12.

The slow clock solution module 44 uses un-differenced refraction-corrected code and carrier phase observations to estimate satellite and receiver clocks, troposphere biases, satellite narrow-lane bias. In one embodiment, the orbit update rate is very low (e.g., 5 minute update rate) for orbit data and a slow clock update rate (e.g., 30 seconds) for slow clock, or even longer. Because a large number of ambiguities have to be estimated together with both receiver and satellites clock parameters, the computation by the data processing center 18 is time-consuming especially with ambiguity resolution and satellite bias estimation. The data processing center 18 or the correction data estimator 34 may wait for longer time to ensure enough measurements from the reference data network 32 (e.g., global network) are collected and processed when they arrive at StarFire data processing center 18s. The longer time the data processing center 18 waits, the more measurements are collected by the data processing center 18, which also results in longer delay for clock corrections to reach mobile receiver 12s of the end users in real-time on a timely basis. The data processing center 18 and the correction data estimator 34 keep the data corrections sufficiently timely in real-time for use by the rover receivers, such that the satellite clocks along with satellite biases preserve the integer nature of ambiguity resolution for rover receiver. The ambiguity fixing can reduce the convergence time and improve the accuracy of navigation by the mobile receiver 12s or rovers.

As illustrated in FIG. 4, in one configuration the low latency clock module 42 further comprises a delta clock filter 412. Although the modules are shown as separate blocks in the block diagram of FIG. 4, it is understood that the correction data estimator 34 illustrated in FIG. 3 and FIG. 4 may be implemented by one or more predictive filters, such as Kalman filters and that the blocks represent one possible interpretation of a illustrative software that can be used to facilitate or carry out the method and system described in this disclosure.

Figure 5:
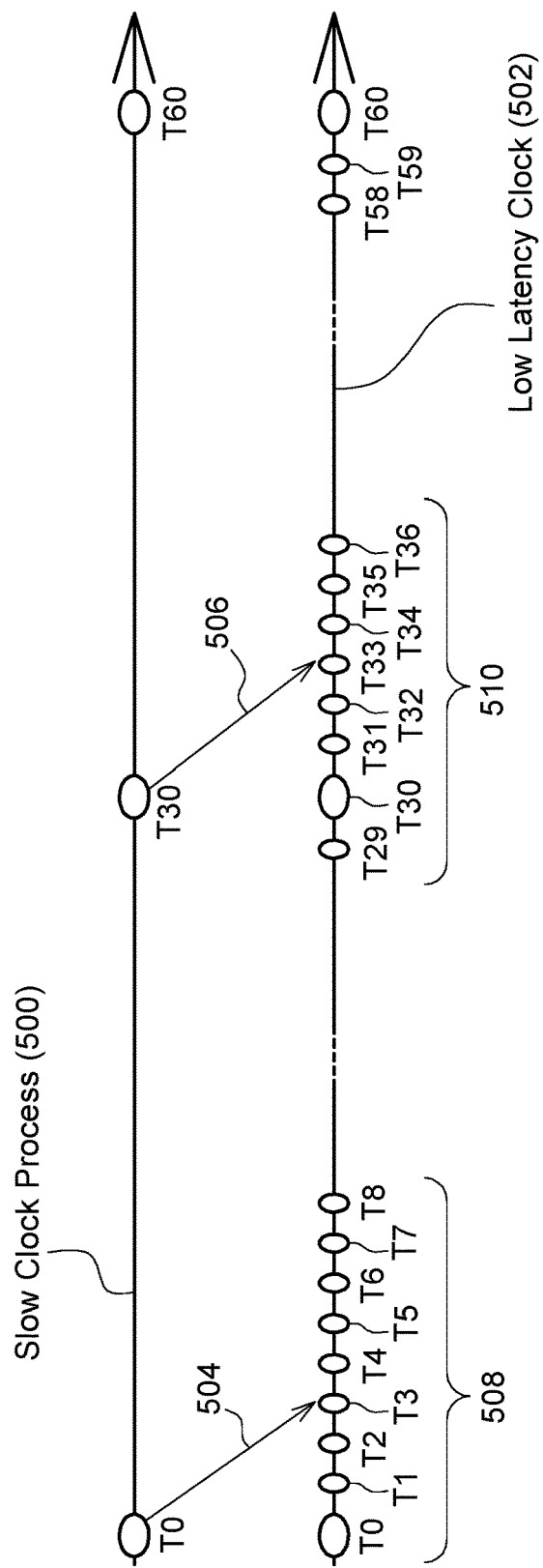
FIG. 5 is a diagram that illustrates the parallel operation of slow clock process (e.g., moderate latency clock process) and the fast clock process (e.g., low latency clock process).

FIG. 5 is a diagram that illustrates the parallel operation of slow clock process 500 (e.g., moderate latency clock process) and the fast clock process 502 (e.g., low-latency clock process). The two parallel axes in FIG. 5 show increasing time to the right to the same time scale. The clock solution module 44 supports or executes the slow clock process 500 (e.g., at slow clock update interval or moderate update interval), whereas the low latency clock module 42 supports or executes the fast clock process 502 or low-latency clock process (e.g., at a fast clock update interval or low-latency update interval). In one embodiment, the clock solution module 44 provides slow clock data (504, 506), such as satellite slow clock correction data, satellite wide-lane bias correction data, satellite narrow-lane bias correction data to the low latency clock module 42 at regular time intervals (e.g., at T0, T30 and T60), such as at a slow clock update interval (e.g., as illustrated approximately 30 time units, such as about 30 seconds). In one embodiment, the orbit solution module 38 may provide satellite orbital correction data 50 separately at an orbit correction rate, whereas in an alternate embodiment, the clock solution module 44 provides the satellite orbital correction data 50 along with the satellite slow clock correction data 16. For example, the clock solution module 44 provides slow clock data at regular time intervals, such as at times T0, T30, and T60, as illustrated in FIG. 4.

Meanwhile, the low latency clock module 42 leverages or uses the slow clock data (504, 506) as a base or input data to compute a delta clock adjustment (508, 510) to the slow clock correction data 16 at a low-latency update interval or fast clock update interval. The low latency clock module 42 outputs correction data 16 or delta clock adjustment (508, 510) at a low-latency update interval that is updated at a greater rate or shorter update time interval than the slow clock update interval. For example, the low latency clock module 42 produces low-latency correction data 16 at a low-latency rate (or fast clock rate) that can be an integer multiple of the slow clock update rate. Further, the low latency clock module 42 or the estimator may assign a validity period to the correction data 16 (e.g., low-latency clock data) or delta clock adjustment that is commensurate with (e.g., approximately equal to) the slow clock update interval.

In one embodiment, the low latency clock module 42 or the delta clock filter 412 uses (e.g., only uses) the carrier phase measurements to compute the clock change (delta clock) as in FIG. 5. The slowly changing parameters, such as troposphere and satellite narrow-lane bias are fixed to, synchronized to, or provided by the estimates from the slow clock solution module 44. The slow clock module provides updates periodically from the slow clock module to the low-latency module (e.g., from slow clock process to low-latency clock process) at an slow clock update rate, such as once every 30 seconds. The low latency clock module 42 uses the delta carrier phase between T0 and current epoch Ti to estimate the delta clock data. When the slow clock module provides new reference epoch such as T30 epoch, the low latency clock module 42 will change reference epoch from T0 to T30.

Figure 6:
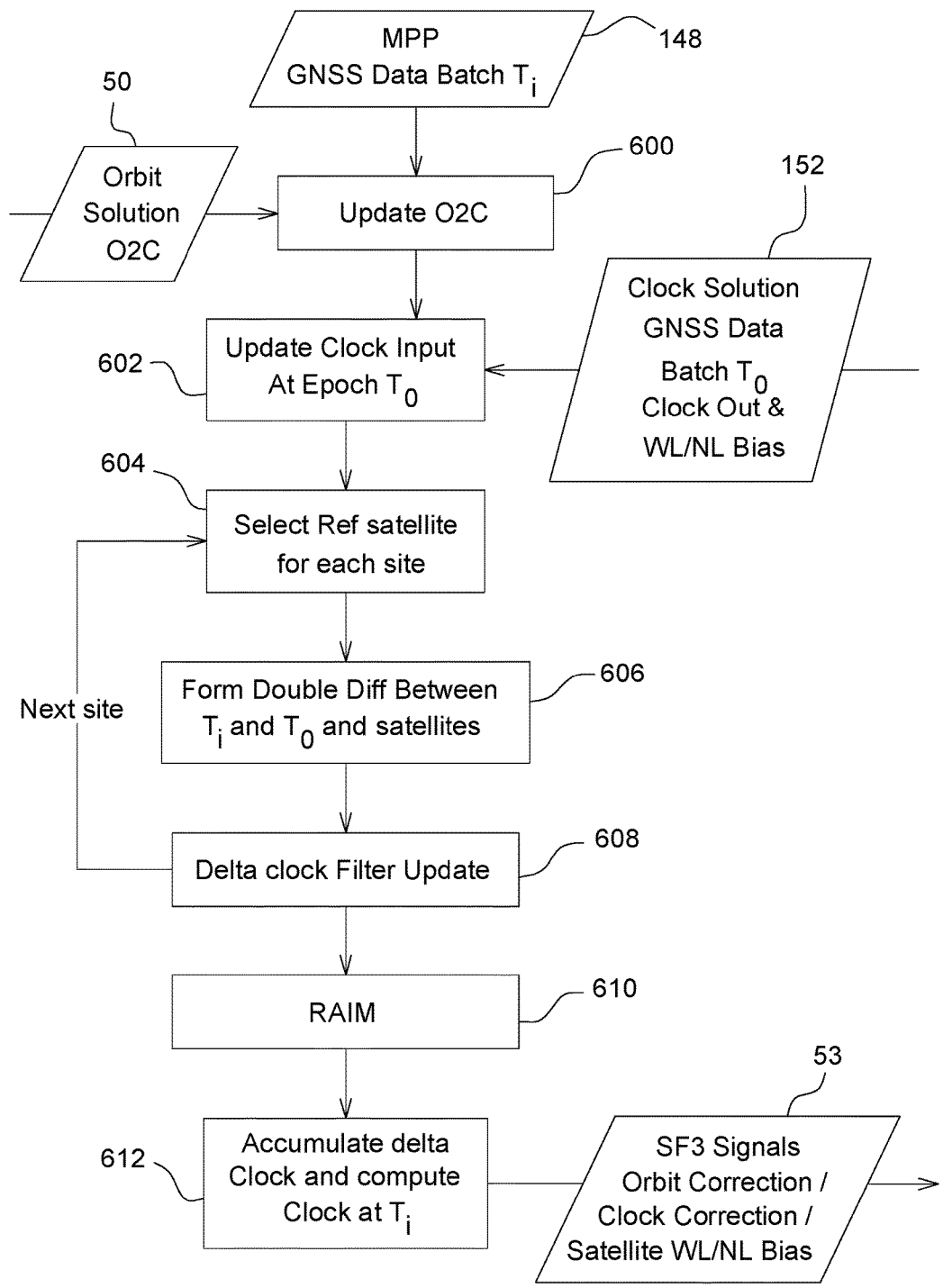
FIG. 6 is a flow chart of one embodiment method for providing a satellite correction signal with a precise, low-latency Global Navigation Satellite System (GNSS) satellite clock.

FIG. 6 is of one embodiment of a method for providing a satellite correction signal with a precise, low-latency Global Navigation Satellite System (GNSS) satellite clock. The method of FIG. 6 begins in block 600.

In block 600, the data processor 20, correction data estimator 34 or the orbit solution module 38 determines the predicted orbital data for a respective measurement time (e.g., epoch Ti), or an update to the predicted orbital data, based upon reference network data 46 (e.g., batch data or raw measurement data for time or epoch Ti) received from one or more reference receivers 30 and previous predicted orbital data (e.g., for time T)) from the orbit solution module 38 or stored in a data storage device 24 (e.g., register, electronic memory, or non-volatile random access memory). Measurement time or epoch (e.g., Ti) can be a next epoch after a previous epoch or first epoch (e.g., T0). Further, the orbit solution module 38 can provide the predicted orbital data (e.g., predicted orbital data for measurement time or epoch Ti) or the update to the predicted orbital data, based on wide-lane ambiguities and corresponding wide-lane ambiguity bias data, where the wide-lane ambiguities and corresponding wide-lane ambiguity bias data are provided by the measurement pre-processing module 36.

In one example of carrying out block 600, the correction data estimator 34 or the orbit solution module 38 estimates the predicted orbital data (e.g., 02C data) over a few minutes at an orbit update rate, such as once every 300 seconds, from the time that orbit solution are fixed in low latency clock module 42.

In block 602, the data processor 20, correction data estimator 34 or clock solution module 44 determines the clock input data, or an update of clock input at measurement time or epoch T0 based on the predicted orbital data (e.g., at measurement time or epoch Ti or epoch T0) and based upon reference network data 46 (e.g., batch data or raw measurement data for time or epoch T0) received from one or more reference receivers 30, slow the clock solution data, wide-lane bias and narrow-lane bias data. As used herein, measurement time or epoch Ti follows measurement time or epoch T0.

For example, in block 602, the data processor 20, correction data estimator 34 or clock solution module 44 determines the clock input data, or an update of the clock input that is updated at slow clock rate or at a slow clock interval. Accordingly, a transition from measurement time T0 to measurement time Ti does not necessarily trigger an update of the clock input data, unless Ti is coincident with the next update interval of the slow clock process. For example, the pre-processed measurements from measurement pre-processing module 36 are batched and sent to low latency clock module 42 for block 604 after a few seconds waiting window, such as 1-2 seconds. Meanwhile, the pre-processed measurements are sent to orbit/clock solutions module after longer period, such as 6-15 seconds.

After block 602, the method continues in block 604. In block 604, the data processor 20, correction data estimator 34, or low-latency module selects a reference satellite for each site of the reference network, or a pair of reference satellites for each reference receiver 30 of the reference network. For example, in one embodiment the correction data estimator 34 or the low-latency module selects the highest elevation satellite without cycle slips as a reference satellite for each reference site. Any difference in elevation between the reference receiver 30 and the mobile receiver 12 should be taken into account for tropospheric bias compensation. The tropospheric biases are corrected using a prior model and residual troposphere bias estimation from slow clock solution.

In block 606, the data processor 20, correction data estimator 34, or the low-latency module determines a double difference between the carrier phase measurements or narrow-lane carrier phase measurements at measurement times or epochs Ti and T0 and the pair of satellites. For example, the double difference is determined for carrier phase measurements at each reference receiver 30 at measurement times or epochs Ti and T0 and the pair of satellites. The double difference (DD) narrow-lane ambiguities are resolved to determine precise refraction-corrected carrier phase measurements for which certain biases are canceled out. For example, in double differencing techniques, one or more of the following biases can cancel out: receiver code phase bias (e.g., receiver code phase bias and satellite code phase bias), carrier phase bias (e.g., receiver phase bias and satellite phase bias) and clock bias (e.g., receiver clock bias and satellite clock bias), that are common between satellites and receivers and can be cancelled out by the double differencing operation between satellites and receivers. Some ionospheric propagation delay bias cancels out in the double-difference equations. The remaining atmospheric errors including ionospheric and tropospheric delay can be ignored after the double differencing for double differencing between the same reference receiver 30 at different times. However, an ionosphere error between different reference receivers 30 separated by long base-lines could be estimated and used by the correction data estimator 34.

In one embodiment, the low latency clock module 42 reduces the correction latency to improve clock accuracy with absolute clocks from slow clock solution. In order to improve computation efficiency, the double differencing measurements between time and satellites are used so that some unnecessary states such as ambiguity and receiver clocks are removed. The low-latency module or the delta clock filter 412 only estimates changes in states for satellite clock for processing efficiency and enhanced rapid availability/reduced latency of the correction data 16 for the mobile receiver 12s.

In one example, the clock solution module 44 determines predicted orbital data, satellite bias data and satellite bias quality data (e.g., variance-co-variance data) based on the resolved double-differenced refraction corrected, narrow-lane ambiguities.

In block 608, the data processor 20, correction data estimator 34 or low latency clock module 42 receives the predicted orbital data, satellite bias data and satellite bias quality data (e.g., variance-co-variance data) based on the resolved double-differenced refraction corrected, narrow-lane ambiguities and provides a delta clock filter 412 update. Prior to the next update of the clock solution module 44 at the slow update rate in block 602, the low latency clock module 42 only estimates delta satellite clocks so that the computation can be updated at a low-latency rate that is greater than the orbit update rate of the orbit solution module 38 and the slow update rate of the clock solution module 44.

In one example of the method of FIG. 6, the method continues with block 604 after each iteration of blocks 604, 606 and 608 for each site or reference receiver 30, until all the calculations of blocks 604, 606 and 608 have been made for all sites or reference receivers 30 in the reference data network 32. Further, each iteration of blocks 604, 606 and 608 is consistent with providing low-latency correction data 16 at a low-latency intervals or a low-latency data rate.

In block 610, the data processor 20, the correction manager 40 or the low-latency clock applies a RAIM (receiver autonomous integrity monitoring) algorithm to the delta clock filter 412. The RAIM algorithm comprises software that uses an over-determined solution or redundant calculations to check the consistency of satellite measurements, such as carrier phase measurements and code phase measurements of one or more satellites for each reference receiver 30 in the network. The RAIM algorithm requires at least five satellites in reception range to detect a material carrier phase error measurement or material error in the clock correction for any satellite in the constellation. The correction manager 40 or data processor 20 may delete, suspend or flag (as suspect or unreliable) low-latency clock correction data 16 for one or more satellites that that is determined to be erroneous or unreliable such that the mobile receiver 12 or rover may ignore or provide less weight to low-latency clock correction data 16 that has been flagged as suspect or unreliable.

In one example of executing block 610, the received satellite signals, low latency clock module 42 or the delta clock filter 412 uses the a priori satellite clock rates from broadcast ephemeris to estimate delta satellite clocks as an error checking mechanism, such as supporting the RAIM algorithm. Within the low latency clock module 42, an additional predictive filter (e.g., Kalman filter or least squares estimator) can be used to estimate delta clock for the RAIM algorithm. Further, the estimated delta satellite clocks derived from the broadcast ephemeris can be compares to the estimated delta satellite clods associated with the predictive filter or lease squares estimator. The number of estimated state variables or unknowns is equal to the number of active satellites. The RAIM algorithm is used to ensure to detect and remove any measurement with cycle slips.

In block 612, the data processor 20, correction data estimator 34, or low latency clock module 42 accumulates delta clock data and computes the clock data that corresponds to measurement time or epoch Ti for incorporation into the correction data 16 or low-latency correction data 16. For example, the low-latency correction data 16 incorporates precise orbital correction data 50, precise low-latency clock data, precise low-latency clock quality data, and wide-lane satellite bias data and narrow-lane satellite bias data on a satellite-by-satellite basis that can be applied to the particular satellites in view of or within reliable reception range of the mobile receiver 12. In one configuration, the correction data 16 can be globally valid in the GNSS system for each corresponding measurement time or epoch and for each satellite to which it pertains.

Figure 7A:
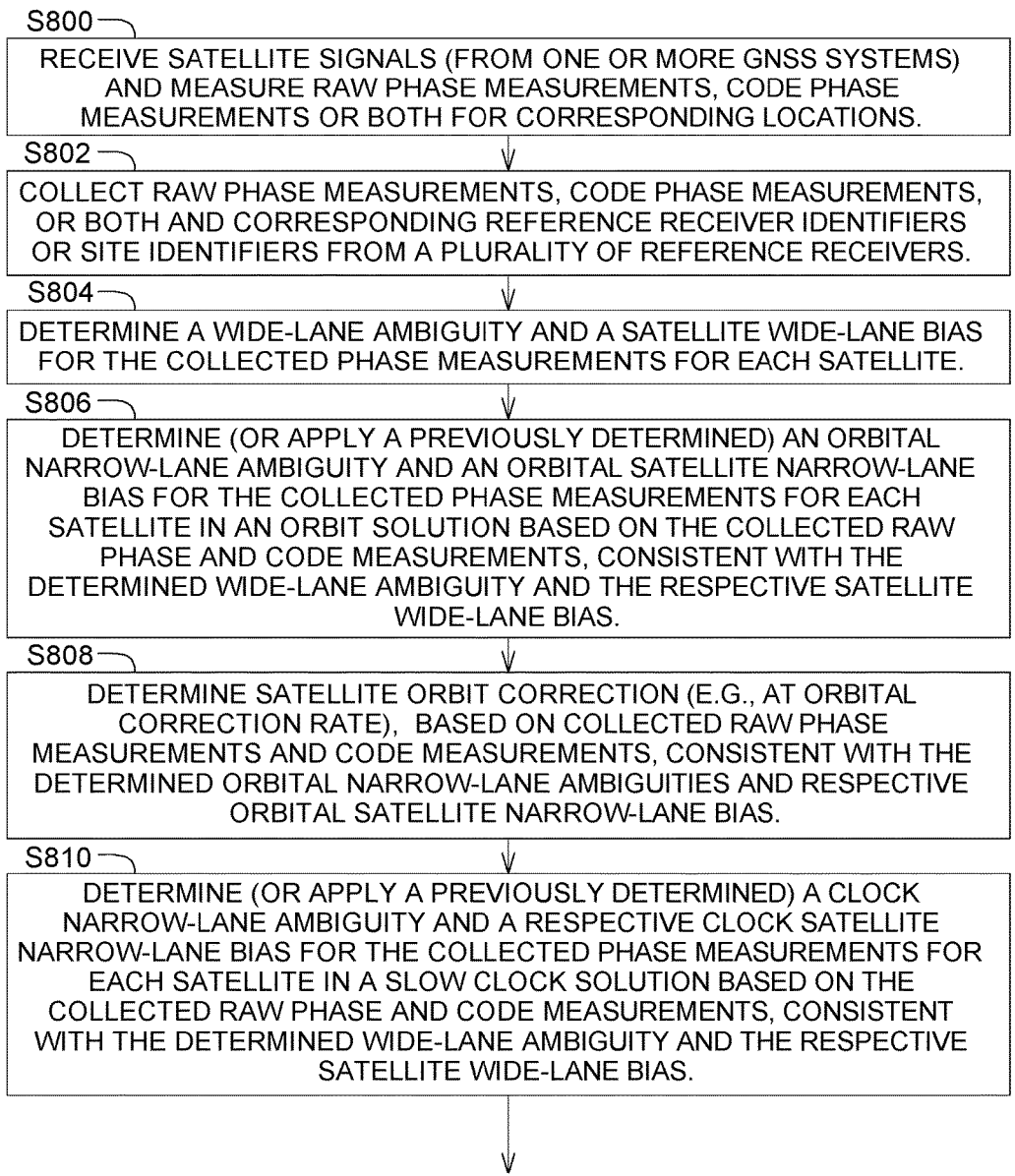
FIG. 7A and FIG. 7B, is a flow chart of another embodiment of a method for providing a satellite correction signal with a precise, low-latency Global Navigation Satellite System (GNSS) satellite clock.
Figure 7B:
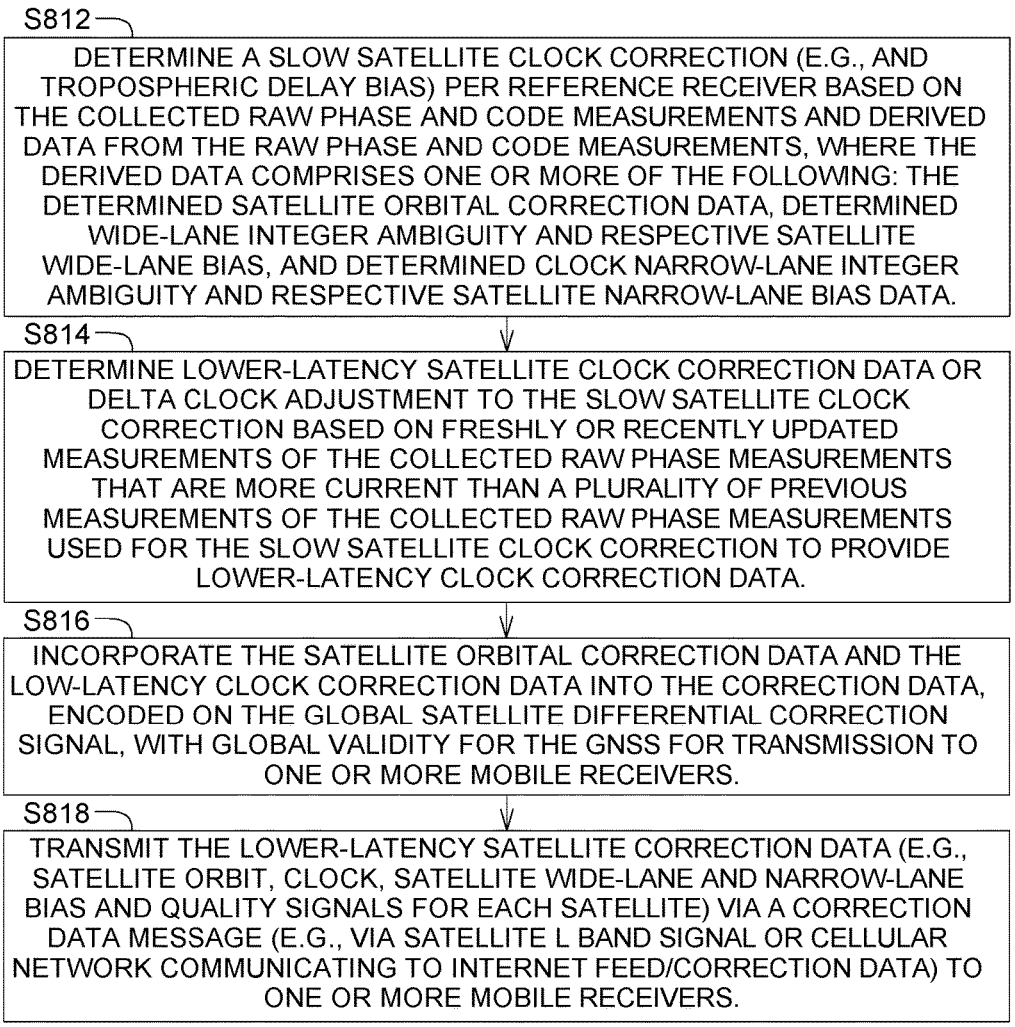

FIG. 7 discloses a flow chart of another embodiment of a method for providing a satellite correction signal with a precise, low-latency Global Navigation Satellite System (GNSS) satellite clock. The method of FIG. 7 begins in step S800.

In step S800, a plurality of reference receivers 30 or measurement module of the reference receivers 30 are located at known corresponding locations (e.g., sites distributed geographically, such as globally throughout the world, to receive satellite signals from one or more GNSS systems) and the reference receivers 30 measure raw phase measurements, code phase measurements or both for corresponding locations. The measurement module makes the raw phase measurements at measurement times that are referred to as epochs. For example, the reference receiver 30 may collect raw phase measurements and code phase measurements (e.g., pseudo-range measurements) at one or more measurement times or epochs that are referenced to Global Navigation Satellite System (GNSS) system time. The code phase measurements are measurements of the code (e.g., pseudo-random noise code) that is encoded on one more received satellite signals or the carriers of the receive satellite signals. The reference receiver 30 transmits or communicates the collected raw phase measurements to the data processing center 18 for estimation of correction data 16, such as precise point positioning (PPP) correction data 16.

In step S802, a data processing center 18 collects raw phase measurements, code phase measurements, or both and corresponding reference receiver 30 identifiers or site identifiers from a plurality of reference receivers 30. The data processing center 18 can use the raw phase measurements and code phase measurements for estimation of correction data 16. Besides the raw phase measurements, code phase measurements, the reference receivers 30 may provide pre-processed data or other reference network data 46 including any of the following: wide-lane ambiguities, narrow-lane ambiguities, ambiguities, estimated position error of the reference station from its known location derived from the received satellite signals, tropospheric bias, satellite clock bias, satellite transmitter 10 bias, ephemeris data, and navigation data.

In step S804, the measurement pre-processing module 36 or the correction data estimator 34 determines a wide-lane ambiguity and a satellite wide-lane bias for the collected phase measurements for each satellite. For example, the measurement pre-processing module 36 or the correction data estimator 34 determines a fixed integer wide-lane ambiguity and a satellite wide-lane bias for the collected phase measurements for each satellite to assist in (e.g., provide constraints for rapid or efficient convergence) estimation of narrow-lane ambiguities within one or more modules of the correction data estimator 34.

In one example of carrying out step S804 the measurement pre-processing module 36 comprises a predictive filter (e.g., wide-lane estimator 37 (e.g., wide-lane filter) or Kalman filter) for estimating the wide-lane ambiguities for the received satellite signals for each reference receiver 30 or its site based on the collected raw phase measurements and code phase measurements, alone or in conjunction with the ancillary data to use as constraints. Further, the determined wide-lane ambiguities facilitates efficient and rapid convergence of one or more narrow-lane estimator 39 (e.g., narrow-lane filter)s (e.g., Kalman filters) that are used for the determination of the orbit solution and the slow clock solution, which are described in other steps of the method of FIG. 7.

In step S806, the orbit solution module 38, the narrow-lane ambiguity resolution estimator, or the correction data estimator 34 determines (or applies a previously determined) an orbital narrow-lane ambiguity and an orbital satellite narrow-lane bias for the collected phase measurements for each satellite in an orbit solution based on the collected raw phase and code measurements, consistent with the determined wide-lane ambiguity and the respective satellite wide-lane bias. In one example, in the absence of the cycle slips and material tropospheric delay changes over a time period, a fixed narrow-lane ambiguity may not require updating, but the set of carrier phase measurements and code phase measurements are updated for the orbit solution at the orbital correction rate (e.g., about once every 300 seconds) that can differ from the slow update rate (e.g., about once every 30 seconds to 60 seconds) of the set of carrier phase measurements and code phase measurements for the slow clock solution. In the presence of cycle slips of the carrier phase or loss of lock of any carrier signal or low signal quality of any satellite received signal, the orbital narrow-lane ambiguity can be updated with input states at an orbital correction rate that can differ from a slow update rate of the slow clock solution, or the clock narrow-lane ambiguity.

In step S808, the orbit solution module 38 or the correction data estimator 34 determines satellite orbit correction (e.g., at orbital correction rate), based on collected raw phase measurements and code measurements, consistent with the determined orbital narrow-lane ambiguities and respective orbital satellite narrow-lane bias.

In step S810, the clock solution module 44, the narrow-lane ambiguity resolution estimator, or the correction data estimator 34 determines (or applies a previously determined) a clock narrow-lane ambiguity and a respective clock satellite narrow-lane bias for the collected phase measurements for each satellite in a slow clock solution based on the collected raw phase and code measurements, consistent with the determined wide-lane ambiguity and the respective satellite wide-lane bias. In one example, in the absence of the cycle slips and material tropospheric delay changes over a time period, a fixed narrow-lane ambiguity may not require updating, but the set of carrier phase measurements and code phase measurements are updated for the slow clock solution at the slow update rate (e.g., about once every 30 second to 60 seconds). In the presence of cycle slips of the carrier phase or loss of lock of any carrier signal or low signal quality of any satellite received signal, the clock narrow-lane ambiguity can be updated with input states at an slow update rate that can differ from a orbital correction rate of the orbit solution.

In step S812, the clock solution module 44 or the correction data estimator 34 determine a slow satellite clock correction (e.g., and tropospheric delay bias and gradients) per reference receiver 30 based on the collected raw phase and code measurements (e.g., previously collected raw phase and code measurements updated at a slow update rate) and derived data from the raw phase and code measurements, where the derived data comprises one or more of the following: the determined satellite orbital correction data 50, determined wide-lane integer ambiguity and respective satellite wide-lane bias, and determined clock narrow-lane integer ambiguity and respective satellite narrow-lane bias data.

In step S814, the low latency clock module 42 or the correction data estimator 34 determines lower-latency satellite clock correction data 16 or delta clock adjustment to the slow satellite clock based on freshly or recently updated measurements (e.g., updated at a fast update rate or a low-latency update rate greater than the slow update rate) of the collected raw phase measurements that are more current than a plurality of previous measurements of the collected raw phase measurements used for the slow satellite clock correction to provide lower-latency clock correction data 16. In some embodiments, the low latency clock module 42 or the clock solution module 44 can apply the delta clock adjustment to the slow clock solution.

Step S814 may be executed in accordance with various techniques, which may be applied separately or cumulatively.

Under a first technique, the clock solution module 44, the low latency clock module 42, or the correction data estimator 34 estimates relative clock error at a first rate (e.g., relatively high rate (e.g., approximately 1 Hz or greater)) using double-difference techniques (e.g., between time, Ti and To and between reference satellites for each reference site of local reference station) for the lower-latency correction data (e.g., highest elevation satellite without cycle slips is selected as the reference satellites for each site).

Under second technique, the lower-latency correction data comprises a fast clock solution and the higher-latency correction data 16 (e.g., moderate-latency correction data 16) comprises a slow clock solution; the clock solution module 44 or the correction data estimator 34 integrates the fast clock solution and the slow clock solution over an integration period (e.g., approximately 30 seconds) to provide an absolute satellite clock estimate (e.g. GPS reference system time).

Under third technique, the lower-latency correction data comprises a fast clock solution and the higher-latency correction data 16 comprises a slow clock solution; the clock solution module 44 or the correction data estimator 34 provides the slow clock solution with a long latency comprising the longer GNSS raw data collection time (e.g., approximately 6 to approximately 10 seconds) for more GNSS raw data and a few seconds of data processing time for a complicated slow clock solution.

Under fourth technique, the lower-latency correction data comprises a fast clock solution and the higher-latency correction data 16 comprises a slow clock solution; the clock solution module 44 or the correction data estimator 34 provides the lower-latency satellite clock correction data 16 (e.g., fast clock solution) with a low-latency including the shorter GNSS raw data collection time (e.g., approximately 1 to approximately 2 seconds) and a data processing time (e.g., of a few milliseconds) for extremely efficient estimation of lower-latency satellite clock correction data 16 (e.g., fast clock solution).

Under fifth technique, the lower-latency correction data comprises a fast clock solution and the higher-latency correction data 16 comprises a slow clock solution; the clock solution module 44 or the correction data estimator 34 uses a troposphere estimation from a slow clock solution in fast clock solution. (e.g., tropospheric bias is estimated based on a priori model and residual tropospheric bias estimation from the slow clock solution).

Under sixth technique, the lower-latency correction data comprises a fast clock solution and the higher-latency correction data 16 comprises a slow clock solution; the clock solution module 44 or the correction data estimator 34 uses orbital correction data 50 (e.g., common orbital correction data 50) from an orbit solution in both slow clock solution and lower latency satellite clock correction data 16 (e.g., fast clock solutions).

Under seventh technique, the lower-latency correction data comprises a fast clock solution and the higher-latency correction data 16 comprises a slow clock solution; the clock solution module 44 or the correction data estimator 34 uses a delta-clock from a lower latency satellite clock correction data 16 (e.g., fast clock solution) to update the slow clock solution. For example, the correction data estimator 34 updates the slow clock solution with an update interval or slow update rate, such as approximately 30 seconds to approximately 60 seconds (e.g., to predict a satellite clock dynamic the in slow clock solution or the accumulated delta-clock or change from a fast clock solution.) Simultaneously with any delta-clock adjustments to the slow clock solution, the slow clock solution, the fast clock solution, or both are updated by the orbit solution or orbital correction data 50 at an orbit correction rate, such as approximately once every 300 seconds to predict a satellite clock dynamic associated with the orbit solution.

Under an eighth technique, the lower-latency correction data comprises a fast clock solution and the higher-latency correction data 16 comprises a slow clock solution; the clock solution module 44 or the correction data estimator 34 uses the lower-latency correction comprises a change in a satellite clock correction based primarily on the raw carrier phase measurements (e.g., GNSS carrier phase data only).

Under an ninth technique, the lower-latency correction data comprises a fast clock solution and the higher-latency correction data 16 comprises a slow clock solution; the clock solution module 44 or the correction data estimator 34 estimates the moderate-latency data to include absolute satellite clocks, tropospheric bias, satellite narrow-lane bias and narrow-lane ambiguity solution.

Under an tenth technique, the lower-latency correction data comprises a fast clock solution and the moderate-latency correction data 16 comprises a slow clock solution; the clock solution module 44 or the correction data estimator 34 estimates correction data 16 that comprises the satellite orbital correction data 50, the lower-latency satellite clock correction data 16, the satellite wide-lane bias data, the satellite narrow-lane bias data, and satellite quality indicators of the lower-latency clock and narrow-lane bias. The correction data 16 can represent integrated and absolute satellite clock data available within a lower-latency satellite correction signal.

In step S816, the correction manager 40 or the correction data estimator 34 incorporates the satellite orbital correction data 50 and the low-latency clock correction data 16 into the correction data 16, encoded on the global satellite differential correction signal, with global validity for the GNSS transmission to one or more mobile receivers 12. For example, the correction data estimator 34 or data processor incorporates the satellite wide-lane bias, the satellite orbital correction data, the satellite narrow-lane bias from the slow clock solution and the low latency clock correction data into the correction data, encoded on the global satellite differential correction signal, with global validity for the GNSS transmission to one or more mobile receivers.

In step S818, the correction manager 40, the wireless communications system 57, or the correction data estimator 34 transmits the lower-latency satellite correction data 16 (e.g., satellite orbit, clock, satellite wide-lane and narrow-lane bias and quality signals for each satellite) via a correction data 16 message (e.g., via satellite L band signal or cellular network communicating to Internet 56 feed/correction data 16) to one or more mobile receivers 12.

As used in this document, latency is based on time difference between an earlier epoch associated with a collection (and observation at reference stations) of measurements for processing and application of processed measurements at a later epoch in mobile rover receiver.

FIG. 8A provides an illustrative chart of typical time lag or delay in providing slow clock solutions versus GNSS time. As illustrated in FIG. 8A, the vertical axis 700 provides slow clock delay time or an indicator of slow clock update interval. Meanwhile, the horizontal axis 702 provides GNSS time such as a GPS time of the corresponding satellite. In one embodiment, the illustrative chart is provided for one or more reference stations (e.g., approximately 60 reference receivers 30) and cluster of at least five satellites that are within view or reliable range. In the illustrative example of FIG. 8A, the slow clock solution takes approximately 2 to 3 seconds to finish the measurement processing for one epoch. After completion of the measurement processing for each epoch, the satellite clock changes (e.g., delta clock data) are integrated with absolute clocks from slow clock solution to derive precise absolute clocks for any epochs. Finally, these orbit, clock corrections and satellite wide-lane (WL), narrow-lane (NL) bias products with quality information are sent to user through a satellite channel (e.g., L-band channel) or wireless communications network (e.g., via Internet 56) in real-time.

FIG. 8B provides an illustrative chart of time lag or delay in providing low-latency clock solutions versus GNSS time. As illustrated in FIG. 8B, the vertical axis 704 provides low-latency clock delay time or an indicator of fast clock update interval or low-latency update interval. Meanwhile, the horizontal axis 706 provides GNSS time such as a GPS time of the corresponding satellite. In one embodiment, the illustrative chart is provided for one or more reference stations and cluster of at least five satellites that are within view or reliable range. If the data processing center 18 comprises a desktop computer or server 54, the data processing center 18 could take a few milliseconds to finish processing all the measurements for the low-latency solution in FIG. 8B, which is more than 300 times faster than the slow clock solution of FIG. 8A. The computation for low-latency is extremely efficient.

The illustrative example of FIG. 8B shows the typical correction age for correction data 16 is approximately 4 seconds from real-time receiver, which includes the time for the network data to arrive at the data processing center 18 (e.g., computer or server 54), the network processing time by the data processing center 18; and the correction transmission time to deliver the correction data 16 or correction data 16 message from the data processing center 18 to the mobile receiver 12 of the end user. Notwithstanding any language to the contrary, the results or delays for correction data 16 shown in FIG. 8A and FIG. 8B are merely shown for illustrative purposes and real world delays may differ from those shown based on many possible factors, even when employing the methods, systems or information set forth in this disclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The following is claimed:

1. A method for providing a global satellite differential correction signal, the method comprising:
   collecting raw carrier phase measurements and pseudorange code measurements from a plurality of reference receivers at known corresponding locations that receive satellite signals from a Global Navigation Satellite System (GNSS);
   determining, by a measurement pre-processing module, a wide-lane ambiguity and a respective satellite wide-lane bias for the collected raw carrier phase measurements and code measurements for each satellite;
   determining an orbital narrow-lane ambiguity and an orbital satellite narrow-lane bias for the collected phase measurements for each satellite in an orbit solution based on the collected raw carrier phase and code measurements, consistent with the determined wide-lane ambiguity and the respective satellite wide-lane bias;
   determining satellite orbital correction data for an orbit solution based on the collected raw carrier phase and code measurements and the determined orbital narrow-lane ambiguity and orbital satellite narrow-lane bias;
   determining a clock narrow-lane ambiguity and a respective clock satellite narrow-lane bias for the collected phase measurements for each satellite in a slow clock solution based on the collected raw phase and code measurements, consistent with the determined wide-lane ambiguity and the respective satellite wide-lane bias;
   determining, by a clock solution module, a slow satellite clock correction based on the satellite orbital correction data, the collected raw carrier phase and code measurements and the determined clock narrow-lane ambiguity and clock satellite narrow-lane bias;
   determining lower-latency satellite clock correction data or delta clock adjustment to the slow satellite clock based on freshly or recently updated measurements of the collected raw phase measurements that are more current than a plurality of previous measurements of the collected raw phase measurements used for the slow satellite clock correction to provide lower-latency clock correction data; and
   incorporating the satellite wide-lane bias, the satellite orbital correction data, the satellite narrow-lane bias from the slow clock solution and the low latency clock correction data into the correction data, encoded on the global satellite differential correction signal, with global validity for the GNSS transmission to one or more mobile receivers.

2. The method according to claim 1 further comprising:
   transmitting the correction data, comprising the lower-latency satellite clock correction data, via a correction data message to one or more mobile receivers.

3. The method according to claim 1 further comprising:
   transmitting, via a satellite communications channel or a wireless communications channel, the lower-latency satellite correction data that comprises satellite orbit, clock, satellite wide-lane bias, satellite narrow lane bias and quality signals for each satellite via a correction data message.

4. The method according to claim 1 wherein the latency can be measured based on time difference between an earlier epoch associated with a collection of phase measurements of satellite signals at one or more reference receivers and receipt of processed measurements at a later epoch in mobile rover receiver.

5. The method according to claim 1 further comprising determining, by the slow clock module a tropospheric delay bias and gradients per reference receiver to facilitate determination of a refraction correction for the clock narrow lane ambiguity and respective narrow lane bias.

6. The method according to claim 1 wherein the determining the lower-latency satellite clock correction data or delta clock adjustment comprises estimating the delta clock adjustment or relative clock error at the fast update rate using double-difference techniques between measurement times or epochs of the phase measurements for a reference receiver.

7. The method according to claim 6 further comprising:
selecting a highest elevation satellite without cycle slips as the reference satellites for the reference receiver at each site.

8. The method according to claim 6 wherein the fast update rate comprises a rate of approximately 1 Hertz or greater.

9. The method according to claim 1 wherein the incorporating further comprises integrating the fast clock solution and the slow clock solution over an integration period to provide an absolute satellite clock estimate.

10. The method according to claim 1 wherein the slow clock solution is provided with a moderate latency comprising the longer GNSS raw data collection time of approximately 6 seconds to approximately 10 seconds for more GNSS raw data and a few seconds of data processing time for a complicated slow clock solution.

11. The method according to claim 1 wherein the lower-latency satellite clock correction data is provided with a lower latency, than the moderate latency of the slow clock solution, including a shorter GNSS raw data collection time of approximately 1 second to approximately 2 seconds.

12. The method according to claim 1 further comprising using a troposphere estimation from the slow clock solution in the lower-latency satellite clock correction data.

13. The method according to claim 1 further comprising using orbital correction data from an orbit solution in the slow clock solution and the lower-latency satellite clock correction data.

14. The method according to claim 1 further comprising using a delta-clock from a lower-latency satellite clock solution associated with a update interval of the slow clock solution such as approximately 30 seconds to approximately 60 seconds predict a satellite clock dynamic the in the slow clock solution, the accumulated delta-clock or change from a fast clock solution associated with an update interval of the orbit solution such as approximately 300 seconds to predict a satellite clock dynamic in the orbit solution.

15. The method according to claim 1 wherein the lower-latency correction comprises a change in a satellite clock correction using GNSS carrier phase data only.

16. The method according to claim 1 wherein the moderate-latency data estimates including absolute satellite clocks, tropospheric bias, satellite narrow-lane bias and narrow-lane ambiguity solution.

17. The method according to claim 1 wherein correction data comprises the satellite orbital correction data, the lower-latency satellite clock correction data, the satellite wide-lane bias data, the satellite narrow-lane bias data, and satellite quality indicators of the lower-latency clock and narrow-lane bias.

18. A method for providing a global satellite differential correction signal, the method comprising:
collecting raw phase measurements and pseudorange measurements from a plurality of reference receivers at known corresponding locations that receive satellite signals from a Global Navigation Satellite System (GNSS);
determining, by a measurement pre-processing module, a fixed integer wide-lane ambiguity and a respective satellite wide-lane bias for the collected raw carrier phase measurements and pseudorange measurements for each satellite;
determining, by an orbit solution module, an orbital narrow-lane ambiguity and an orbital satellite narrow-lane bias for the collected phase measurements for each satellite in an orbit solution based on the collected raw carrier phase and psuedorange measurements, consistent with the determined wide-lane ambiguity and the respective satellite wide-lane bias;
determining satellite orbital correction data at an orbit correction rate for the orbit solution based on the collected raw carrier phase and psuedorange measurements and the determined orbital narrow-lane ambiguity and orbital satellite narrow-lane bias;
determining a clock narrow-lane ambiguity and a respective clock satellite narrow-lane bias for the collected phase measurements for each satellite in a slow clock solution based on the collected raw phase and pseudorange measurements, consistent with the determined wide-lane ambiguity and the respective satellite wide-lane bias;
determining, by a clock solution module, a slow satellite clock correction at a slow update rate based on the satellite orbital correction data, the collected raw phase and pseudorange measurements and the determined clock narrow-lane ambiguity and clock satellite narrow-lane bias;
determining lower-latency satellite clock correction data or delta clock adjustment to the slow satellite clock at a fast update rate based on freshly or recently updated measurements of the collected raw phase measurements that are more current than a plurality of previous measurements of the collected raw phase measurements used for the slow satellite clock correction to provide lower-latency clock correction data; and
incorporating the satellite orbital correction data, the low latency clock correction data, the satellite wide-lane bias and the satellite narrow-lane bias into the correction data, encoded on the global satellite differential correction signal, with global validity for the GNSS for transmission to one or more mobile receivers that operate in a precise point positioning (PPP) mode.

19. The method according to claim 18 wherein the orbit rate is less than the slow update rate.

20. The method according to claim 18 further comprising:
applying an orbit zero-difference filter to facilitate the estimation of the orbit narrow-lane ambiguity and respective narrow-lane satellite bias at the orbit update rate based on the collected raw phase measurements.

21. The method according to claim 18 wherein the fast update rate is greater than the slow update rate or the orbit rate.

22. The method according to claim 18 further comprising:
applying an clock zero-difference filter to facilitate the estimation of the orbit narrow-lane ambiguity and respective narrow-lane satellite bias at the slow update rate based on the collected raw phase measurements.

* * * * *